US006832265B1

(12) United States Patent
Ma et al.

(10) Patent No.: US 6,832,265 B1
(45) Date of Patent: Dec. 14, 2004

(54) METHODS AND APPARATUS FOR MOVING DATA ELEMENTS WITHIN A DATA COMMUNICATIONS DEVICE

(75) Inventors: Qingming Ma, Santa Clara, CA (US); Saravanan Agasaveeran, Sunnyvale, CA (US); Satish Gannu, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/479,511

(22) Filed: Jan. 7, 2000

(51) Int. Cl.[7] .............................................. G06F 15/16
(52) U.S. Cl. .................................. 709/250; 370/395.42
(58) Field of Search ................................. 709/240–241, 709/250, 105, 318; 719/318; 710/35, 48, 59, 261–266, 269; 370/230–231, 236, 238, 359, 361, 395.21, 373, 448, 412–419, 463, 395.42

(56) References Cited

U.S. PATENT DOCUMENTS

| | | | | |
|---|---|---|---|---|
| 4,715,030 A | * | 12/1987 | Koch et al. .................. | 370/401 |
| 5,291,480 A | | 3/1994 | Nimon ....................... | 370/58.1 |
| 5,392,280 A | * | 2/1995 | Zheng ........................ | 370/353 |
| 5,598,541 A | * | 1/1997 | Malladi ...................... | 710/106 |
| 5,754,799 A | * | 5/1998 | Hiles .......................... | 710/110 |
| 5,864,535 A | * | 1/1999 | Basilico ...................... | 370/231 |
| 5,919,250 A | * | 7/1999 | Shimokawa ................ | 709/252 |
| 5,991,302 A | * | 11/1999 | Berl et al. ................... | 370/400 |
| 5,999,531 A | * | 12/1999 | Ferolito et al. ............. | 370/390 |
| 5,999,534 A | * | 12/1999 | Kim ........................ | 370/395.42 |

(List continued on next page.)

FOREIGN PATENT DOCUMENTS

| | | | | |
|---|---|---|---|---|
| JP | 0891083 | * | 1/1999 | ............ H04N/7/14 |
| WO | WO 98/36538 | * | 8/1998 | ........... H04L/12/44 |

OTHER PUBLICATIONS

Lee et al, "Delay Fairness in Demand Priority Networks", IEEE, 1999, pp. 789–792.*

(List continued on next page.)

*Primary Examiner*—Bunjob Jaroenchonwanit
(74) *Attorney, Agent, or Firm*—Chapin & Huang, LLC; David E. Huang, Esq.

(57) ABSTRACT

The invention is directed to techniques for moving data elements within a data communications device which prioritizes handling transmit interrupts over handling receive interrupts. Preferably, while attending to transmit interrupts, the device gives priority to the "hungriest" interfaces. In one arrangement, the device includes multiple network interfaces which are capable of transmitting and receiving data elements with a network, and a controller, coupled to the interfaces. The controller is configured to perform a method comprising the steps of: assigning weights to the interfaces based on interface transmission capacities and/or the number of data elements ready for transmission through the interfaces; determining which of the interfaces indicates readiness to transmit a data element to the network and which of the interfaces indicates receipt of a data element from the network; exclusively running, for each interface indicating readiness to transmit a data element to the network, a transmit interrupt handler to load that interface with a data element for transmission if such a data element is available for transmission within the data communications device (the handling order of the interfaces being determined by the weights so that the "hungriest" interfaces are handled first); and after the step of exclusively running transmit interrupt handlers, running, for at least one interface which indicates receipt of a data element from the network, a receive interrupt handler to process that data element and restricting the amount of time consumed running the receive interrupt handlers before handling transmit interrupts again. Since the device prioritizes handling transmit interrupts over receive interrupts in a weighted preferential manner, the device handles transmit interrupts as early as possible to move data elements quickly to the interfaces. Accordingly, it is less likely that interfaces will "starve" for data elements.

30 Claims, 12 Drawing Sheets

U.S. PATENT DOCUMENTS

| | | | | |
|---|---|---|---|---|
| 6,032,179 | A | * | 2/2000 | Osborne ..................... 709/213 |
| 6,078,733 | A | * | 6/2000 | Osborne ..................... 709/250 |
| 6,094,435 | A | | 7/2000 | Hoffman et al. ............. 370/414 |
| 6,154,446 | A | | 11/2000 | Kadambi et al. ............ 370/239 |
| 6,188,698 | B1 | * | 2/2001 | Galand et al. ............... 370/412 |
| 6,366,583 | B2 | * | 4/2002 | Rowett et al. ............... 370/401 |
| 6,370,607 | B1 | * | 4/2002 | Williams et al. ............ 710/262 |
| 6,373,848 | B1 | * | 4/2002 | Allison et al. ............... 370/401 |
| 6,434,153 | B1 | * | 8/2002 | Yazaki et al. ........... 370/395.21 |
| 6,484,209 | B1 | * | 11/2002 | Momirov .................... 709/238 |
| 6,519,260 | B1 | * | 2/2003 | Galyas et al. .......... 370/395.42 |
| 6,617,879 | B1 | * | 9/2003 | Chung ........................ 326/82 |
| 6,628,655 | B1 | * | 9/2003 | Fieschi et al. ............... 370/389 |
| 6,701,384 | B1 | * | 3/2004 | Fukuta .......................... 710/5 |
| 6,732,209 | B1 | * | 5/2004 | Cherukuri et al. .......... 710/240 |
| 6,742,046 | B2 | * | 5/2004 | Yamamoto et al. ......... 709/240 |
| 2003/0128707 | A1 | * | 7/2003 | Kalkunte et al. ...... 370/395.41 |

OTHER PUBLICATIONS

Goyal, "Lookahead Network", IEEE, 1995 pp. 1160–1170.*
Wu et al, "Integration of Synchronous and Asynchropnous Traffic on the Metering Architecture and its Analysis", 1992, IEEE, pp. 0147–0153.*

* cited by examiner $$\text{WEIGHT} = \frac{1}{\text{NUMBER OF PROCESSED DATA ELEMENTS STORED IN THE INTERCONNECTION MECHANISM READY FOR TRANSMISSION THROUGH THE TRANSMIT CIRCUIT OF THE INTERFACE}}$$

FIG. 8C

METHODS AND APPARATUS FOR MOVING DATA ELEMENTS WITHIN A DATA COMMUNICATIONS DEVICE

BACKGROUND OF THE INVENTION

A typical network router receives and transmits packets in order to transfer these packets along paths within a network. Generally, such a router receives a packet from one portion of the network through a first network interface (i.e., a network port, link, interface device, etc.), and transmits that packet through another network interface to another portion of the network based on routing information associated with that packet, in order to forward or "route" that packet from its source towards its intended destination.

Some network routers receive and transmit packets using interrupts. FIG. 1 illustrates such a router 20. The router 20 includes interfaces 22 (e.g., 22-1, . . . , 22-G) and an interconnection mechanism 24. Each interface 22 includes a receive circuit RC which receives packets 25 from a network (not shown) and a transmit circuit TM which transmits packets 25 to the network. Each receive circuit RC includes a receive queue 32 and a receive interrupt status flag (or bit) 34. Each transmit circuit TM includes a transmit queue 36 and a transmit interrupt status flag (or bit) 38. Typically, the transmit queue 36 is smaller than the receive queue 32. For example, in a Weighted Fair Queuing implementation, the transmit queue 36 may be capable of holding only one or two packets while the receive queue 32 is capable of holding several packets. In other configurations, the transmit queue 36 may be configurable and not necessarily capable of only holding one or two packets.

It should be understood that the respective receive and transmit circuits RC, TM of each interface 22 typically reside together, e.g., as a single device or on a single printed circuit board (PCB). As such, the pair of receive and transmit interrupt status flags 34, 38, which belong to the receive and transmit circuits RC, TM of a particular interface 22, typically reside together in a single memory location or register (e.g., an interrupt status register) which is readable by a single read operation.

The interconnection mechanism 24 includes memory 26 and a processor or central processing unit (CPU) 28. The memory 26 stores an operating system 30 and software queues 40 which are respective extensions of the transmit queues 36 of the transmit circuits TM. For example, a first software queue 40 temporarily stores packets 25 to be transmitted by a transmit circuit 22-1-TM of a first interface 22-1, a second software queue 40 temporarily stores packets 25 to be transmitted by a transmit circuit 22-2-TM of a second interface 22-2, and so on.

When the router 20 is in a normal operating mode, the operating system 30 directs the processor 28 to perform a procedure 50 to fully attend to each interface 22 in a round robin manner. That is, the operating system 30 directs the processor 28 to select an interface 22 (e.g., interface 22-1), handle any transmit interrupts for the selected interface 22 by moving any packets 25 which are ready for transmission from that interface's software queue 40 to that interface's transmit queue 36, subsequently handle any receive interrupts for the selected interface 22 by processing packets 25 from that interface's receive queue 32, and then proceed to handle the next interface 22 (e.g., interface 22-2) in a similar manner. When the processor 28 processes a packet 25 from a receive queue 32, the processor typically (i) identifies an interface 22 through which to transmit that packet 25 based on routing information associated with that packet 25 (e.g., a destination address residing in the header of that packet), and (ii) moves that packet 25 to the transmit queue 36 of the identified interface 22 if that transmit queue is not full, or to the software queue 40 associated with the identified interface 22 if that transmit queue 36 is full. It should be understood that the processor 28 may or may not be able to respond immediately to the receive and transmit interrupts depending on whether there exists any higher priority tasks or interrupt handlers.

FIG. 2 illustrates further details of this procedure 50. In step 52, the processor 28 selects an interface 22. To this end, the processor 28 reads the contents of a memory location of the selected interface 22 containing the receive and transmit interrupt status flags 34, 38 of that interface 22.

In step 54, if the transmit interrupt status flag 38 of the selected interface 22 indicates that a transmit interrupt is pending for the transmit circuit TM of the selected interface 22, the processor 28 proceeds to step 56. Otherwise, the processor 28 proceeds to step 58.

In step 56, the processor 28 handles the pending transmit interrupt of the selected interface 22. Typically, step 58 involves the processor 28 executing a transmit interrupt handler (part of the operating system 30) for the selected interface 22. The transmit interrupt handler directs the processor 28 (i) to reset the transmit interrupt status flag 38 of that interface 22, and (ii) to move any packets 25 residing in a software queue 40 associated with that interface 22 from that software queue 40 to the transmit queue 36 of the transmit circuit TM of that interface 22.

In step 58, if the receive interrupt status flag 34 of the selected interface 22 indicates that a receive interrupt is pending for the receive circuit RC of the selected interface 22, the processor 28 proceeds to step 60. Otherwise, the processor 28 proceeds to step 62.

In step 60, the processor 28 handles the receive interrupt of the selected interface 22. Typically, in step 60, the processor 28 executes a receive interrupt handler (part of the operating system 30) for that interface 22. The receive interrupt handler directs the processor 28 (i) to reset the receive interrupt status flag 38 of that interface 22, and (ii) to move any packets 25 residing in the receive queue 32 of the receive circuit RC of that interface 22 to their appropriate software queue 40.

In step 62, the processor 28 determines whether it should continue normal operation, i.e., continue to attend to the interfaces 22. If the processor 28 determines that it should terminate normal operation (e.g., if the processor 28 receives a shutdown or reset command), the processor 28 terminates the procedure 50. Otherwise, step 62 proceeds to step 64.

In step 64, the processor 28 selects another interface 22. Step 64 then proceeds back to step 54 for another pass of steps 54 through 62.

It should be understood that each pass of steps 54 through 62 forms a larger step 66 of handling any transmit and receive interrupts for the currently selected interface 22. Each time the processor 28 performs step 64, the processor 28 selects a different interface 22 until the processor 28 has selected each interface 22. Accordingly, the operation of the router 20 essentially involves the steps of selecting an interface 22, handling any transmit and receive interrupts for that interface 22, and then repeating these steps for the remaining interfaces 22 to continuously attend to the interfaces 22 such that the processor 28 selects and attends to the interfaces 22 in a round robin manner.

SUMMARY OF THE INVENTION

Historically, a common belief is that a conventional router's processor or CPU is not a major source of performance difficulties. That is, it is commonly believed that the processor is not a bottleneck and that packets do not have a tendency to accumulate within the router. Under this belief, it is viewed that, as fast as the packets arrive at the router, the router selects interfaces and transmits the packets through the selected interfaces. This may be true if the router's packet forwarding paths are simple to determine. For example, this may be true if the router operates according to a queuing algorithm which uses a simple first-in-first-out (FIFO) approach.

However, recent advances have provided opportunities for a router's processor to become a source of performance drawbacks. In particular, factors such as the deployment of new Quality of Service (QoS) features and more complex policy-based networking approaches are making packet processing more complicated and burdensome on a router's processor.

In general, the majority of packet processing involves the determination of the packet forwarding path. For example, packet classification and policy-based scheduling may require extensive searching through an access control list (ACL) which can be very time consuming and demanding on a router's CPU. Additionally, flow-based weighted fair queuing (WFQ) approaches may require extensive searching of a queue list to determine the next packet to be transmitted. Furthermore, as network topologies grow and become more complex, the calculation and distribution of routing information may require more routing time and processing operations. Accordingly, the demands on the router's processor may further increase in the future.

The invention is based in part on the observation that conventional routers (i) can be particularly susceptible to CPU bottlenecks caused by growing routing decision complexity, and (ii) may become more susceptible to such bottlenecks because conventional routers do not handle transmit interrupts in a very timely manner. This drawback stems in part from the earlier-described conventional round robin approach implemented by conventional routers. In this conventional approach, the router's processor fully attends to any transmit and receive interrupts of one interface before proceeding to fully attend to those interrupts of the next interface, and so on. When the router's processor attends to an interface, the router's processor selects an interface, handles any transmit interrupts of that interface, subsequently handles any receive interrupts of that interface, and then proceeds to do the same for another interface until the processor has attended to each interface in round robin fashion. This approach is a potential cause of starvation by the transmit circuits of the interfaces of such a router. Further details of this drawback will now be explained by the following example.

Suppose that the router 20 of FIG. 1 uses a flow-based WFQ approach to route packets 25. Under this approach, the router 20 does not know which packet 25 to send until the router 20 transmits a currently processed packet 25. Under this approach, the transmit queues 36 of the transmit circuits TM of the router interfaces 22 are typical in size, i.e., capable of holding only one or two packets 25 at a time.

During operation, as the transmit circuit TM of each interface 22 completes transmission of a packet 25, that interface 22 sends a transmit interrupt to the processor 28 (e.g., identified by the transmit interrupt flag 38 of that interface 22). If the processor 28 is not busy (i.e., if there is no CPU bottleneck), the processor 28 will execute a transmit interrupt handler for that interface 22 in order to move any packets 25 available for transmission through that interface 22 into the transmit queue 36 of that interface 22. In this situation, the processor 28 is capable of keeping the transmit circuit TM of that interface 22 busy.

However, if the processor 28 is busy handling a receive interrupt (executing a receive interrupt handler for another interface 22), the transmit circuit TM will have to wait for the processor 28 to complete its work of handling the receive interrupt of the other interface 22. As the processor 28 handles the receive interrupt of the other interface 22, the processor 28 may process several packets 25 from the receive queue 32 of the receive circuit RC of that other interface 22.

Unfortunately, with the WFQ approach, the processing of each packet 25 is particularly time consuming. In particular, for each packet 25, the processor 28 typically performs a lookup operation using the ACL, or performs a computation, to select the interface 22 through which to transmit the next packet 25 (i.e., to determine the next hop and/or virtual time for forwarding the next packet 25). Since the processor 28 handles both the transmit and receive interrupts for one interface 22 after another, the initial interface 22 that sent the transmit interrupt may wait a substantial amount of time before the processor 28 is ready to handle that transmit interrupt. Accordingly, conventional routers 20, such as that described-above, are highly susceptible to CPU bottlenecks and associated performance degradation drawbacks.

In contrast to conventional routers which, for each network interface, fully attend to any transmit and receive interrupts of that interface before attending to another interface, the invention is directed to techniques for moving data elements (e.g., packets, frames, cells, etc.) within a data communications device which gives higher priority to handling transmit interrupts relative to handling receive interrupts. In one arrangement, the data communications device exclusively runs all of the transmit interrupt handlers to provide data elements to network interfaces for transmission prior to running receive interrupt handlers to process received data elements, and provides global weighted preferential treatment to these transmit interrupts in order to minimize the idle times of transmit circuits of the interfaces.

In one arrangement, a data communications device includes multiple network interfaces which are capable of transmitting and receiving data elements with a network. The data communications device further includes a controller, coupled to the multiple network interfaces. The controller is configured to perform a method comprising the steps of: (A) determining which of the multiple network interfaces indicates readiness to transmit a data element to the network and which of the multiple network interfaces indicates receipt of a data element from the network; (B) exclusively running, for each network interface indicating readiness to transmit a data element to the network, a transmit interrupt handler to load that network interface with a data element for transmission if such a data element is available for transmission within the data communications device; and (C) after step B, running, for at least one network interface which indicates receipt of a data element from the network, a receive interrupt handler to process that data element. Since the data communications device exclusively runs transmit interrupt handlers before any receive interrupt handlers, the data communications device is less likely to delay handling transmission of data elements through the network interfaces. In general, this arrangement allows the data communications device to handle transmit interrupts as early as possible to move data elements quickly to the network interfaces. Accordingly, this arrangement gives higher priority to handling transmit interrupts over handling receive interrupts, and it is less likely that network interfaces will "starve" for data elements.

In one arrangement, a situation may arise when more than N network interfaces indicate receipt of a data element from the network, N being a positive integer. In this arrangement, the controller is configured such that step C involves (i) running, for N network interfaces indicating receipt of a data element from the network, a receive interrupt handler to process that data element; and (ii) refraining from running receive interrupt handlers for more than the N network interfaces until step A and step B are repeated. Accordingly, the controller has the opportunity to again attend to transmit interrupts thus reducing idle time of transmit circuits of the interfaces.

In another arrangement, a situation may arise where the network interfaces receive more than X data elements, X being a positive integer. In this arrangement, the controller is configured such that step C involves (i) running, for at least one network interface indicating receipt of a data element from the network, a receive interrupt handler to process that data element until X data elements have been processed; and (ii) refraining from processing more than the X data elements until step A and step B are repeated. As a result, the controller has the opportunity to again attend to transmit interrupts thus lowering idle time of transmit circuits of the interfaces.

In one arrangement, the controller is configured such that step C involves (i) running, for a particular network interface which indicates receipt of a first data element from the network, a transmit interrupt handler to load the particular network interface with a second data element for transmission if such a second data element is available for transmission within the data communications device; and (ii) subsequently running a receive interrupt handler to process the first data element. Accordingly, when the controller is ready to handle a receive interrupt for a particular network interface, the controller checks whether there is a transmit interrupt pending for that interface and handles that transmit interrupt before handling the receive interrupt. As a result, the controller can give priority to any transmit interrupt that occurs on that interface between the time the controller initially checks for interrupts, and the time the controller is ready to handle a receive interrupt for that interface.

In another arrangement, the controller is configured such that step C involves (i) running, for a particular network interface which indicates receipt of a data element from the network, a receive interrupt handler to process that data element; and (ii) running a transmit interrupt handler for another interface through which that data element is to be transmitted if a transmit interrupt is pending for that other interface. In this arrangement, the controller can check the interface through which that data element is to be transmitted and handle any transmit interrupt for that interface. Accordingly, the controller can give priority to any transmit interrupt pending at that interface over handling another receive interrupt.

In one arrangement, the controller is configured such that the method further includes the step of assigning weights to the network interfaces based on transmission capacities of the network interfaces such that, in step B, transmit interrupt handlers for the network interfaces run in an order determined by the assigned weights.

In another arrangement, the controller is configured such that the method further includes the step of assigning weights to the network interfaces based on numbers of data elements ready for transmission through each network interface such that, in step B, transmit interrupt handlers for the network interfaces run in an order determined by the assigned weights.

In another arrangement, the controller is configured such that the method further includes the step of assigning weights to the network interfaces based on transmission capacities of the network interfaces and numbers of data elements ready for transmission through each network interface such that, in step B, transmit interrupt handlers for the network interfaces run in an order determined by the assigned weights.

In yet another arrangement, the controller is configured such that the method further includes the step of assigning weights to the network interfaces based on respective numbers of processed data elements which are ready for transmission through the network interfaces such that, in step B, transmit interrupt handlers for the network interfaces run in an order determined by the assigned weights.

In any of the above-described arrangements, the assignment of weights to the interfaces and the running of transmit interrupt handlers for the interfaces in an order based on the assigned weights enables the techniques of the invention to provide weighted preferential treatment to the transmit interrupts in addition to the already described preferential treatment of transmit interrupts over receive interrupts.

In another arrangement, a data communications device includes a first network interface which stores a data element to be processed by data communications device, a second network interface, and an interconnection mechanism coupled to the first and second network interfaces. The interconnection mechanism includes (i) memory which stores a first processed data element and a second processed data element, and (ii) a controller. The controller is configured to perform a method comprising the steps of: (A) moving a first processed data element from the interconnection mechanism to the first network interface for transmission of the first processed data element into a network through the first network interface; (B) after step A, moving a second processed data element from the interconnection mechanism to the second network interface for transmission of the second processed data element into the network through the second network interface; and (C) after step B, moving the data element stored by the first network interface from the first network interface to the interconnection mechanism.

In addition to the above-described method and data communications device arrangements, other arrangements of the invention are directed to a computer program product. In one arrangement, the computer program product includes a computer readable medium having instructions stored thereon. The instructions, when processed by a data communications device having multiple network interfaces which are capable of transmitting and receiving data elements with a network, cause the data communications device to perform the steps of: (A) determining which of the multiple network interfaces indicates readiness to transmit a data element to the network and which of the multiple network interfaces indicates receipt of a data element from the network; (B) exclusively running, for each network interface indicating readiness to transmit a data element to the network, a transmit interrupt handler to load that network interface with a data element for transmission if such a data element is available for transmission within the data communications device; and (C) after step B, running, for at least one network interface which indicates receipt of a data element from the network, a receive interrupt handler to process that data element.

The features of the invention, as described above, may be employed in data communications devices and other computerized devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 7D is a flow diagram of a procedure, which is suitable for use as an alternative to the procedures of FIGS. 7A and 7B, having steps for running a receive interrupt handler to process a data element and then handling any transmit interrupt of the interface through which that data element is to be transmitted through.

FIG. 8C is a block diagram of an operation for determining a weight for a network interface, which is suitable as an alternative to the operations of FIGS. 8A and 8B.

DETAILED DESCRIPTION OF PREFERRED EMBODIMENTS

The invention is directed to techniques for moving data elements (e.g., packets, cells, frames, etc.) within a data communications device, which uses transmit and receive interrupts, to give higher priority to handling the transmit interrupts relative to handling the receive interrupts. This minimizes the idle time of outbound links making the techniques of the invention well suited for increasing processing demands. In one arrangement, the data communications device exclusively runs all of the transmit interrupt handlers to provide data elements to network interfaces for transmission prior to running receive interrupt handlers to process received data elements in a manner that provides global weighted preferential treatment to transmit interrupts.

Figure 1:
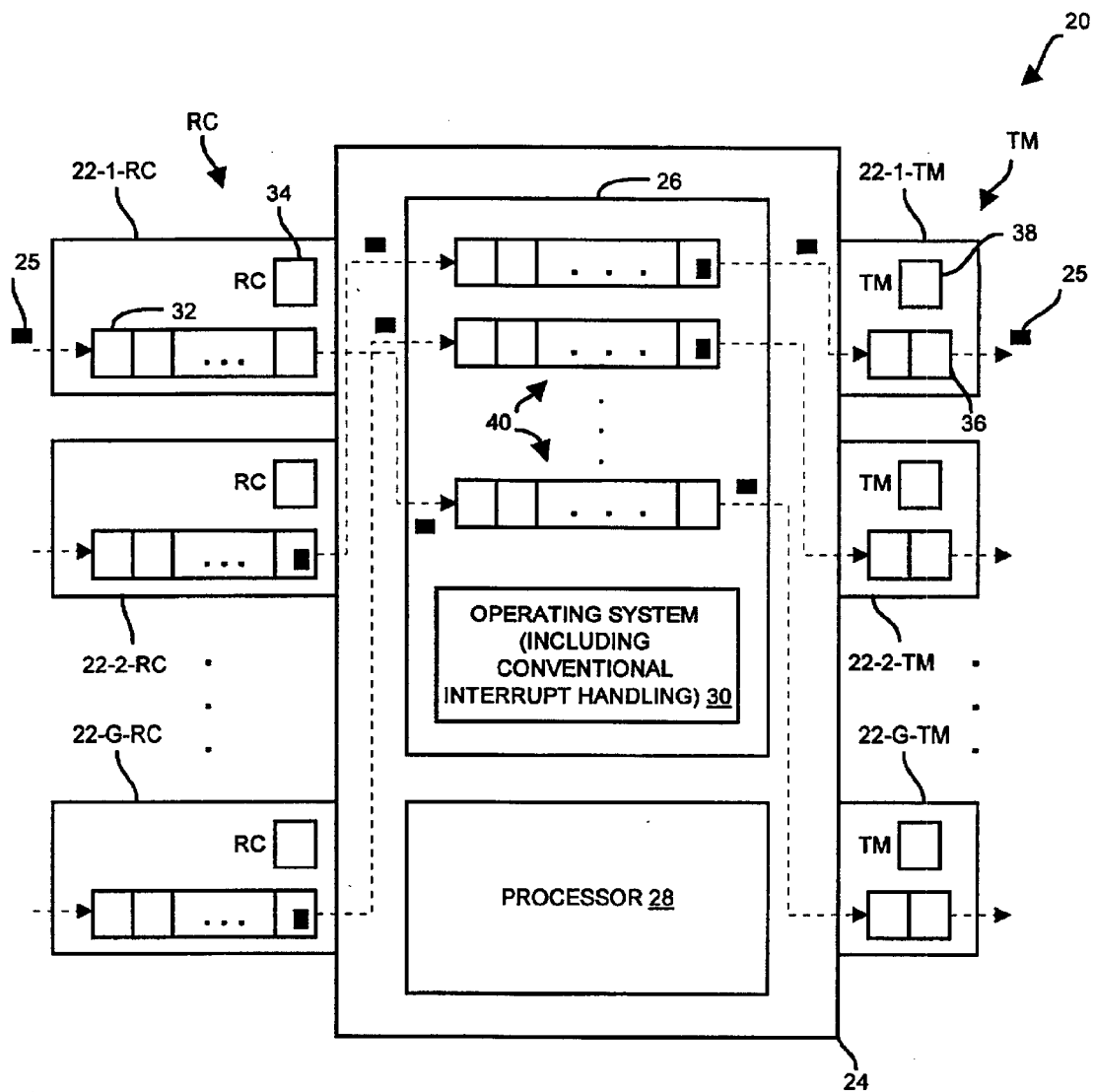
FIG. 1 is a block diagram of a prior art data communications device which moves packets between receive and transmit portions of network interfaces according to a conventional interrupt handling approach.
Figure 2:
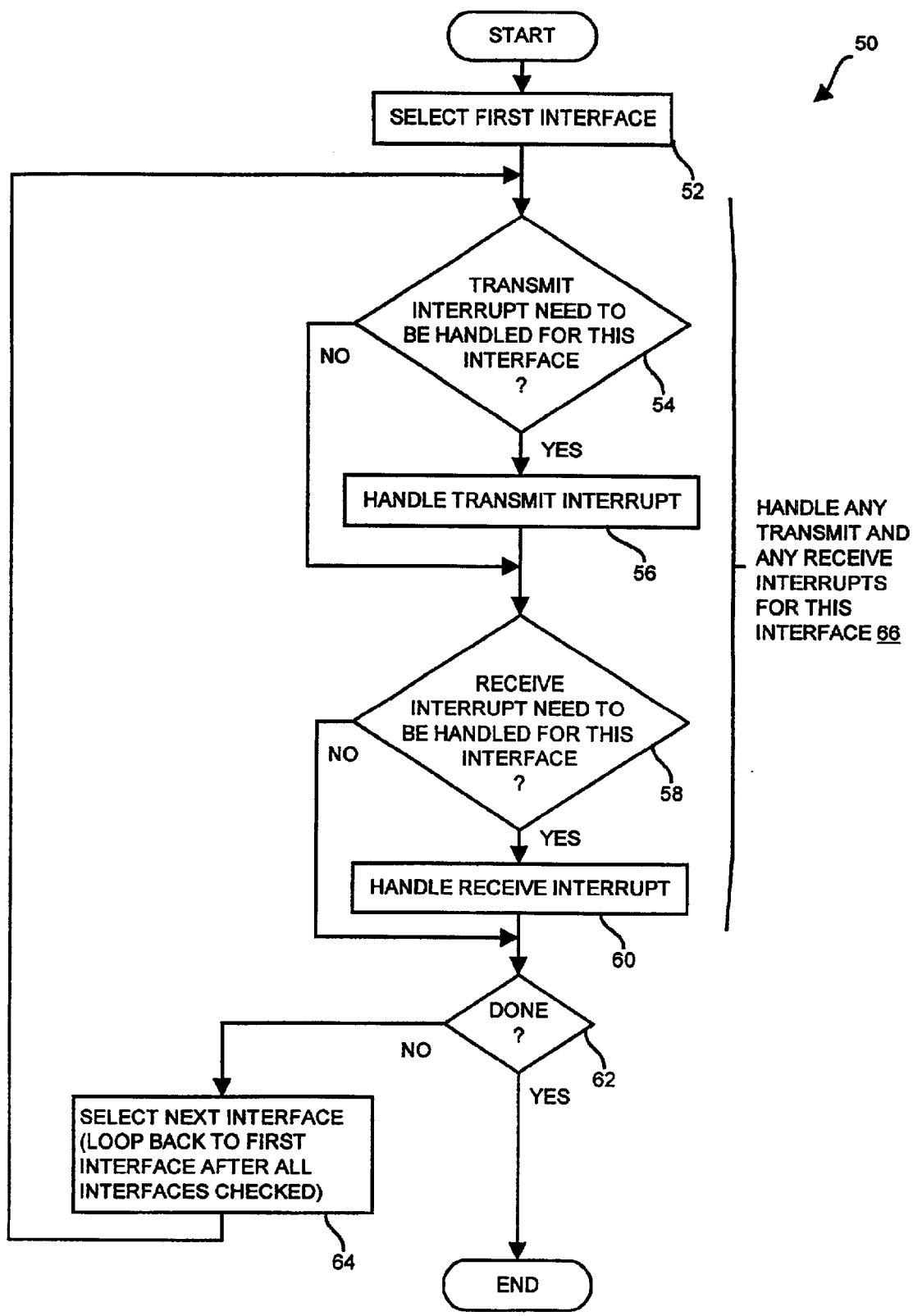
FIG. 2 is a flow diagram of a procedure performed by the prior art data communications device of FIG. 1.
Figure 3:
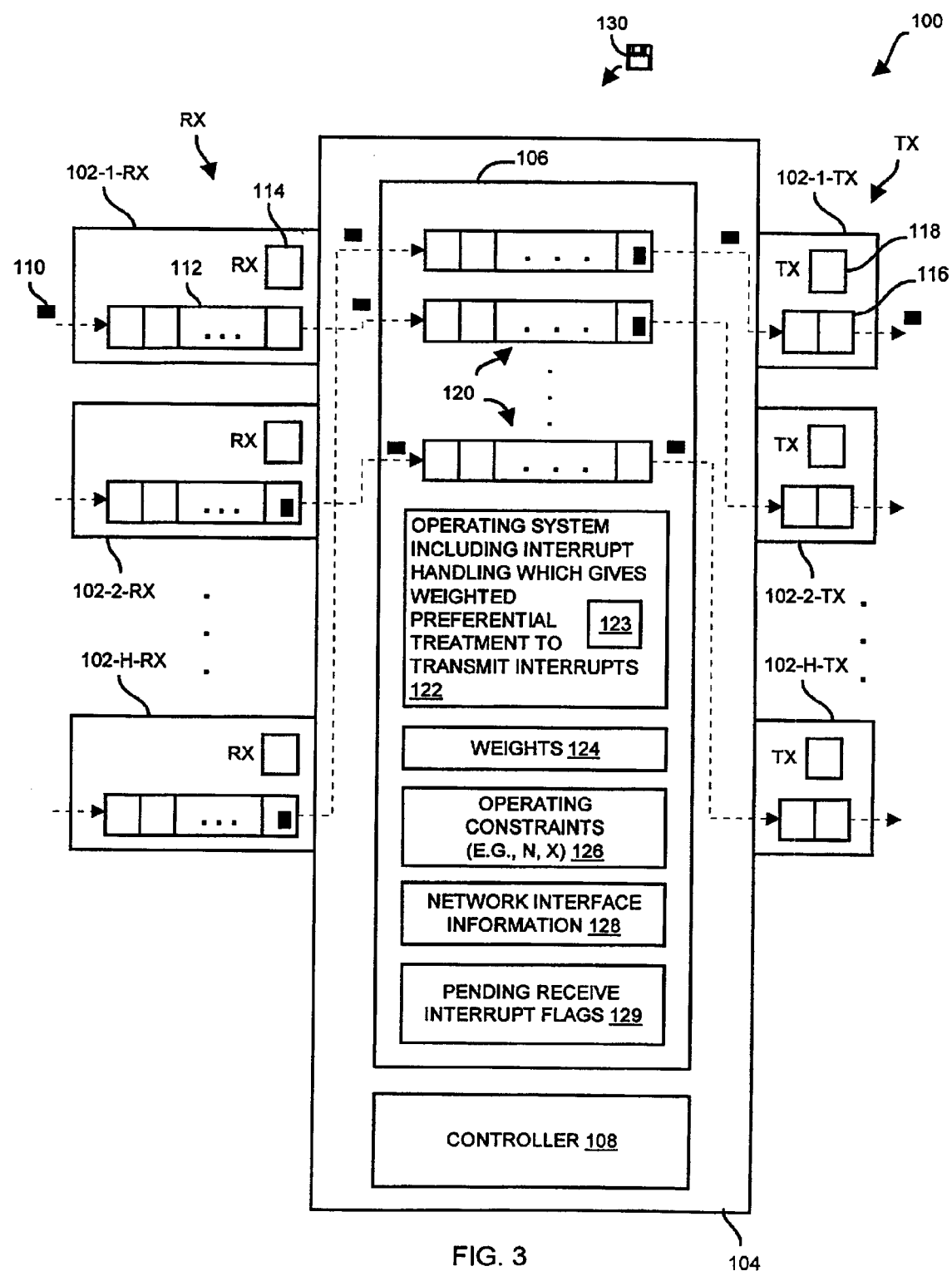
FIG. 3 is a block diagram of a data communications device which transfers data elements between receive and transmit portions of network interfaces in accordance with the invention.

FIG. 3 shows a data communications device 100 which is suitable for use by the invention. The data communications device 100 includes multiple network interfaces 102 (e.g., 102-1, . . . , 102-H, where H is a positive integer) and an interconnection mechanism 104. Each interface 102 includes a receive circuit RX which receives data elements 110 from a network (not shown) and a transmit circuit TX which transmits data elements 110 to the network. Each receive circuit RX includes a receive queue 112 and a receive interrupt status flag (or bit) 114. Each transmit circuit TX includes a transmit queue 116 and a transmit interrupt status flag (or bit) 118.

The receive and transmit circuits RX, TX are shown on different sides of the data communications device 100 to better illustrate the flows of data elements within the data communications device 100. However, it should be understood that the respective receive circuit RX and the transmit circuit TX of each interface 102 can reside together, e.g., in a single device or on a single printed circuit board (PCB). In such a situation, the pair of receive and transmit interrupt status flags 114, 118, which belong to the receive and transmit circuits RX, TX of a particular interface 102, can reside together in a single memory location or register (e.g., an interrupt status register) which can be read in a single read operation. Alternatively, receive and transmit interrupt status flags 114, 118 can reside in separate memory locations or registers which can be read in separate read operations.

The interconnection mechanism 104 includes memory 106 and a controller 108, e.g., a processor, CPU, application specific integrated circuit (ASIC), specialized hardware, etc. The memory 106 stores a number of memory constructs including software queues 120, an operating system 122, weights 124, operating constraints 126, network interface information 128, and pending receive interrupt flags 129. The operating system 122 includes a set of interrupt handlers 123 for handling receive and transmit interrupts from the network interfaces 102.

In one arrangement, a computer program product 130 (e.g., one or more CDROMs, diskettes, tapes, etc.) provides one or more of the above-listed memory constructs to the computer system 100. For example, in one arrangement, the computer program product 130 includes the operating system 122 with the set of interrupt handlers 123. In this arrangement, the operating system 122 and the set of interrupt handlers 123 can be installed on the computer system 100, and then controlled (e.g., by a system administrator) to create one or more of the other memory constructs such as the operating constraints 126 and the network interface information 128. The Cisco IOS manufactured by Cisco Systems of San Jose, Calif. is suitable for use as the operating system 122. As an alternative example, the computer system 100 can acquire the operating system 122 through other means, e.g., via a network download into the memory 106 through one or more of the interfaces 102.

Each software queue 120 in the memory 106 is associated with a respective one of the network interfaces 102, and operates as an extension of the transmit queue 116 of the transmit circuit TX of that interface 102. For example, a first software queue 120 temporarily stores data elements 110 to be transmitted by a transmit circuit 102-1-TX of a first network interface 102-1, a second software queue 120 temporarily stores data elements 110 to be transmitted by a transmit circuit 102-2-TX of a second network interface 102-2, and so on.

Further details of the invention will now be explained with reference to FIG. 4. When the router 100 is in a normal operating mode, the operating system 122 directs the controller 108 to perform a procedure 140 (see FIG. 4) to respond to transmit and receive interrupts from the network interfaces 102. In step 142, the controller 108 assigns weights 124 (also see FIG. 3) to the interfaces 102 based on the network interface information 128 or software queues 120 stored in the memory 106 or transmit queues 116. The weights 124 may be static or dynamically updated. Further details of how the controller 108 assigns the weights 124 will be discussed later below.

In step 144, the controller 108 determines which of the network interfaces 102 have transmit interrupts pending which indicate readiness to transmit a data element 110 to the network and which of the network interfaces 102 have receive interrupts pending which indicate receipt of a data element 110 from the network. For example, the controller 108 can read the transmit interrupt status flags 118 of the transmit circuits TX to determine which interfaces 102 are ready to transmit a data element 110 (i.e., which interfaces 102 have sent a transmit interrupt). Similarly, the controller 108 can read the receive interrupt status flags 114 of the receive circuits RX and the pending receive interrupt flags 129 to determine which interfaces 102 have received a data element 110 from the network. As will be explained in further detail later, the pending receive interrupt flags 129 (one flag 129 associated with each interface 102) indicate which interface 102 had receive interrupt status flags 114 which were reset by the controller 108 even though the controller 108 could not attend to removing all of the received data elements 110 from the receive queues 112 of those interfaces 102.

In step 146, the controller 108 exclusively runs a transmit interrupt handler for each interface 102 indicating readiness to transmit a data element in order to load that interface 102 with a data element 110 if such a data element 110 is available within the data communications device 100 (i.e., within the software queue 120 associated with that interface 102). Preferably, in step 146, the controller 108 (i) resets the transmit interrupt status flag 118 of the transmit circuit TX of that interface 102, and (ii) moves any data elements 110 residing in the software queue 120 associated with that interface 102 from that software queue 120 to the transmit queue 116 of the transmit circuit TX of that interface 102. Such exclusively handling of transmit interrupts (i.e., before handling any receive interrupts) minimizes the idle time of the transmit circuits TX of the interfaces 102. If none of the interfaces 102 has a transmit interrupt pending, the controller 108 will not run a transmit interrupt handler for any interfaces 102.

In step 148, the controller 108 runs receive interrupt handlers for any interfaces 102 indicating receipt of a data element 110 (e.g., if at least one interface 102 receives a data element 110) to process newly received data elements 110 within the receive queues 112 of the interfaces 102 until an operating constraint 126 (also see FIG. 3) is reached or, if the operating constraint 126 is not reached, for each interface 102 indicating receipt of a data element 110. If the operating constraint 126 is reached and at least one received data element 110 is not processed from an interface 102, that interface 102 is identified again in the next round within step 144 as an interface 102 with at least one pending received data element 110 to be processed. As explained above, a pending receive interrupt flag 129 is associated with each interface 102 for such identification. If none of the interfaces 102 receives a data element 110, the controller 108 will not run a receive interrupt handler for any interfaces 102.

It should be understood that when the controller 108 processes a data element 110, the controller 108 determines which interface 102 that data element 110 should be transmitted through based on information associated with that data element 110 (e.g., routing information such as a destination address in a header of that data element 110). The controller 108 then attempts to move that data element 110 from the receive queue 112 to the transmit queue 116 of the interface 102 through which that data element 110 will be transmitted. If the transmit queue 116 is full, the controller 108 moves that data element 110 into the software queue 102 associated with the interface 102 through which that data element 110 will be transmitted.

In step 150, the controller 108 determines whether it should continue normal operation, i.e., whether it should continue to respond to transmit and receive interrupts from the interfaces 102. If the controller 108 determines that it should terminate normal operation (e.g., if the controller 108 receives a shutdown or reset signal), the controller 108 terminates the procedure 140. Otherwise, the controller 108 proceeds back to step 142 to repeat steps 142 through 150.

During normal operation, the controller 108 repeats steps 142 through 148 in a looping manner. The assigned weights 124 preferably direct the controller 108 to respond to the "hungrier" interfaces 102 (i.e., the interfaces 102 which have more capacity for transmitting data elements 110) before responding to the "less hungry" interfaces 102. In one arrangement, the weights 124 are dynamic and can change with each repetition of step 142, or across multiple repetitions of step 142 (e.g., periodically after performing step 142 every 10 times, or after every K seconds of operation, thus alleviating the need to repeat step 142 for each loop). In another arrangement, the weights 124 are static and do not change such that step 150 of the procedure 140 can proceed to step 144 rather than to step 142 when looping back. Preferably, in either arrangement, when the controller 108 performs the procedure 140, the controller 108 gives global weighted preferential treatment to the handling of transmit interrupts over receive interrupts in order to minimize idle time of the transmit circuits TX of the interfaces 102. Further details of the weights 124 will be provided later below.

Figure 4:
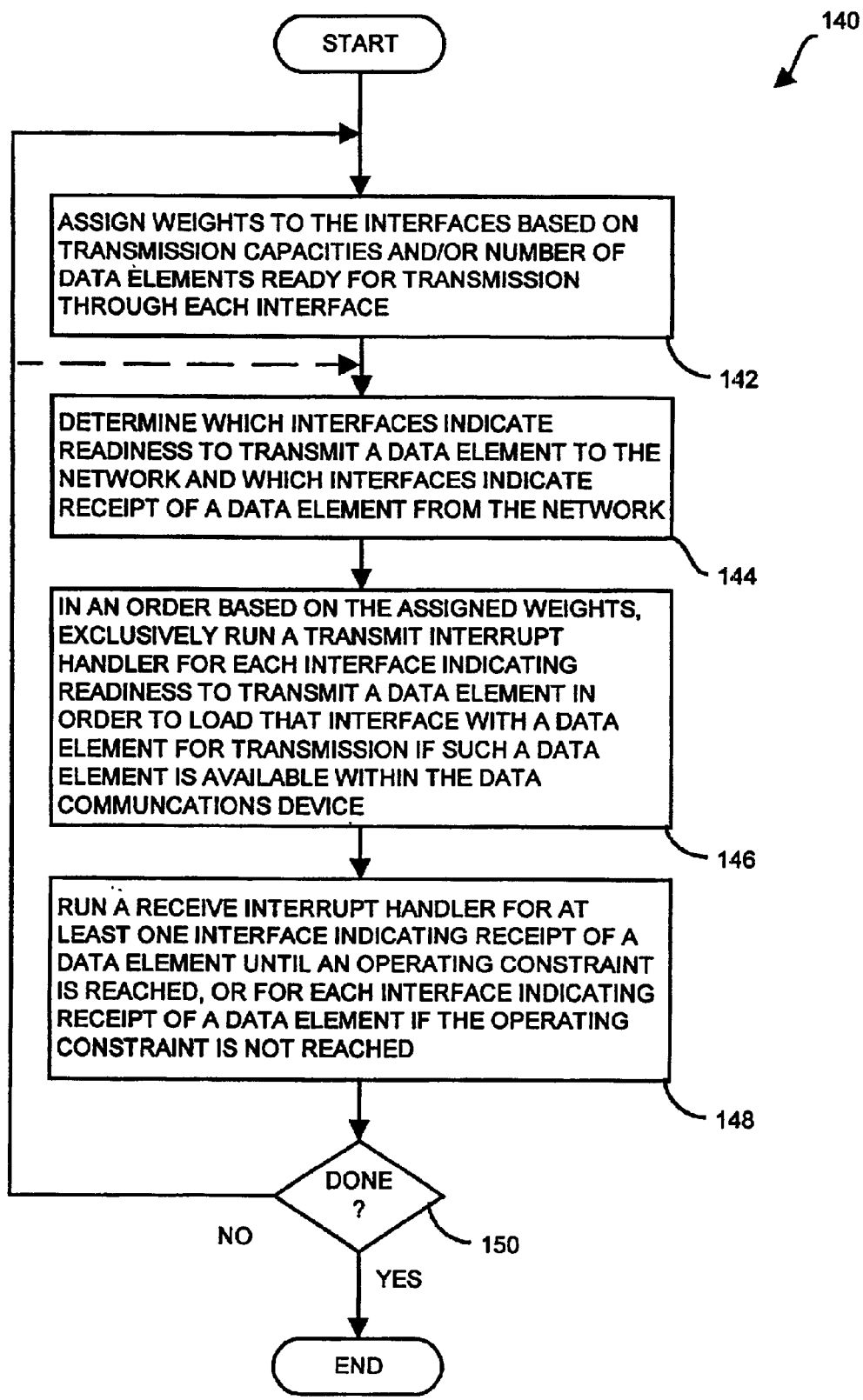
FIG. 4 is a flow diagram of a procedure performed by the data communications device of FIG. 3 in accordance with the invention.
Figure 5:
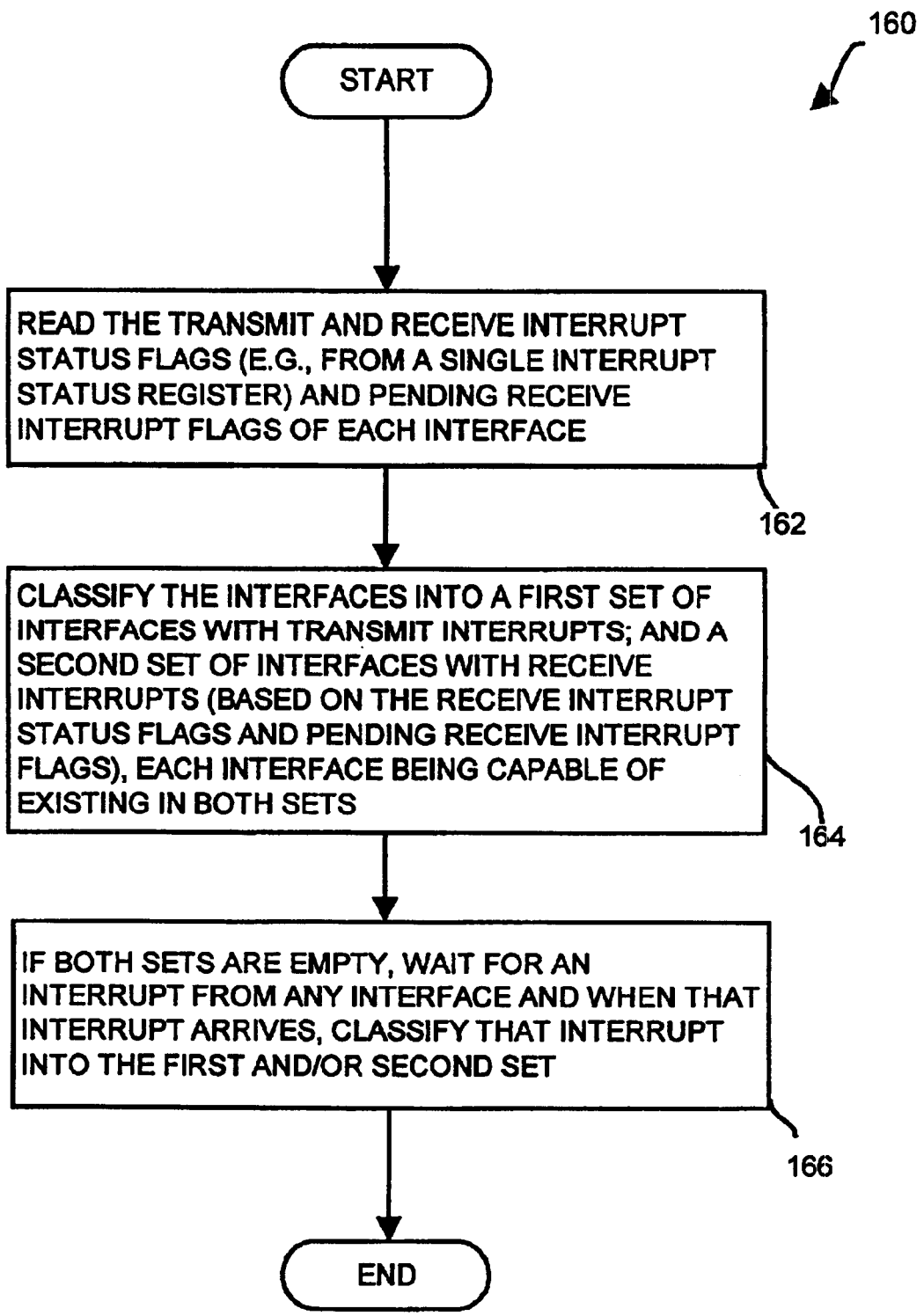
FIG. 5 is a flow diagram of a procedure for determining which network interfaces indicate readiness to transmit a data element and which network interfaces indicate receipt of a data element, which is suitable for use as a step of the procedure of FIG. 4.

FIG. 5 illustrates a procedure 160 that is suitable for use as step 144 of the procedure 140 shown in FIG. 4, in which the controller 108 determines which network interfaces 102 are ready to transmit a data element 110 to the network and which have received a data element 110 from the network. In step 162, the controller 108 reads the transmit and receive interrupt status flags 118, 114 and pending receive interrupt flags 129 of all of the interfaces 102. In a situation where the transmit and receive interrupt status flags 118, 114 of an interface 102 reside in a single interrupt status register, the controller 108 can read that register in a single read operation. In a situation where the transmit and receive interrupt status flags 118, 114 reside in separate memory locations of an interface 102, the controller 108 can read each of those memory locations (e.g., using separate read operations) to obtain the transmit and receive interrupt status flags 118, 114.

In step 164, the controller 108 classifies the interfaces 102 into a first set of interfaces 102 within which transmit interrupts are pending, and a second set of interfaces within which receive interrupts are pending. An interface 102 can belong to both sets if there is a transmit interrupt (i.e., that interface 102 is ready to transmit a data element 110), and receive interrupt pending for that interface 102 (i.e., that interface 102 has received a new data element 110 from the network, or the pending receive interrupt flag 129 indicates that at least one data element 110 remains pending in the receive queue 112 of that interface 102). Furthermore, an interface 102 can belong to neither set if there is no transmit interrupt and no receive interrupt pending for that interface 102.

In step 166, if both the first and second sets are empty (i.e., there are no transmit or receive interrupts), the controller 108 waits for an interrupt to occur within any network interface 102. For example, the controller 108 may proceed to run other software processes until it encounters an interrupt from an interface 102 with either a transmit interrupt (e.g., flag 118 set) or a receive interrupt (e.g., flag 114 set) pending. After step 166, the procedure 160 terminates.

Figure 6:
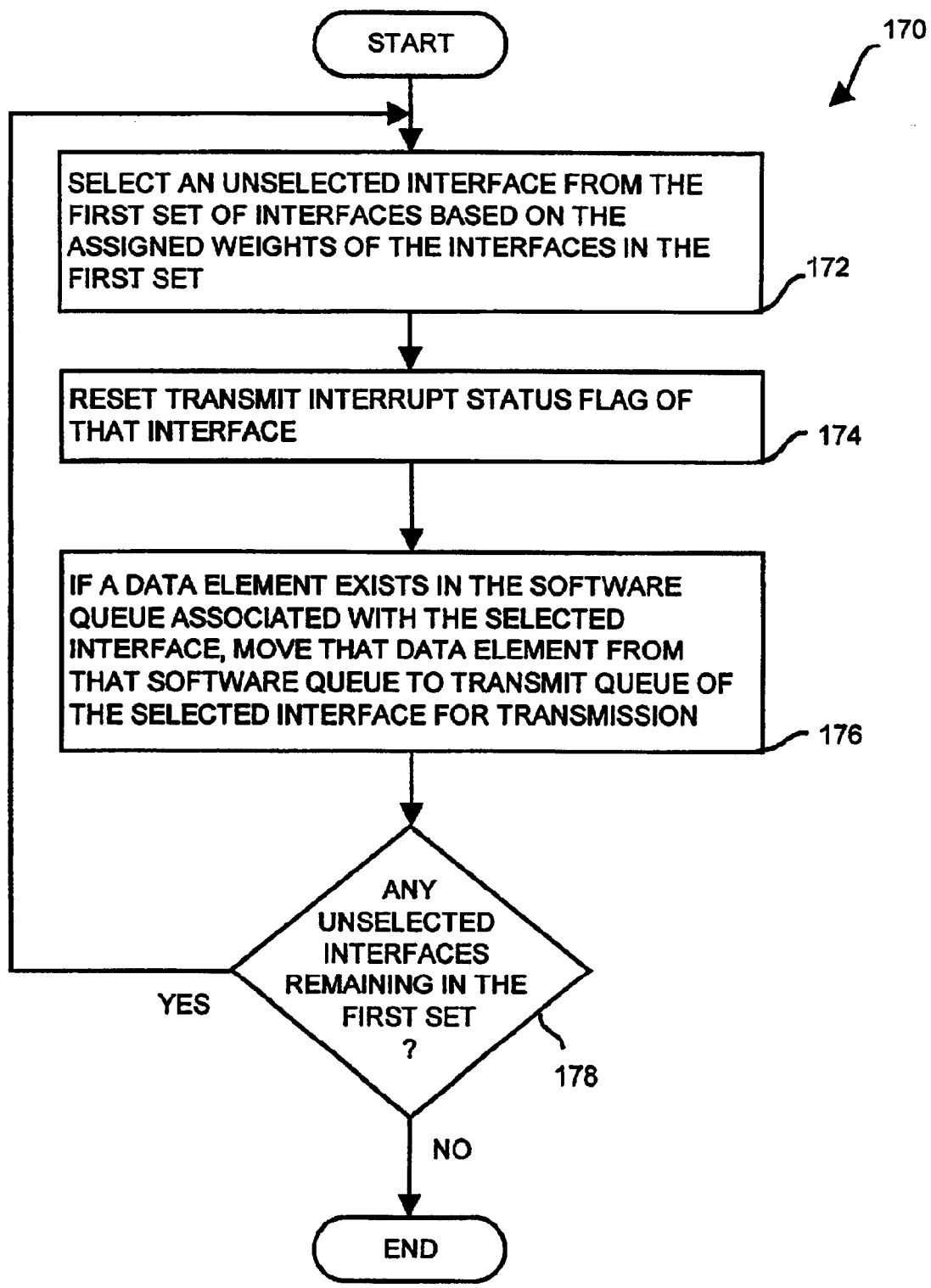
FIG. 6 is a flow diagram of a procedure for exclusively running a transmit interrupt handler for each network interface indicating readiness to transmit a data element, which is suitable for use as a step of the procedure of FIG. 4.

FIG. 6 illustrates a procedure 170 that is suitable for use as step 146 of the procedure 140 (see FIG. 4), in which the controller 108 exclusively run a transmit interrupt handler for each interface 102 indicating readiness to transmit a data element 110. If there are no interfaces 102 indicating such readiness, procedure 170 terminates and does not perform steps 172 through 176 shown in FIG. 6. However, if there is at least one interface in the first set, the controller 108 proceeds to step 172.

In step 172, the controller 108 selects an unselected interface 102 from the first set of interfaces 102 (i.e., the interfaces 102 with transmit interrupts) based on the assigned weights 124 of the interfaces 102. Preferably, the controller 108 selects the interface of the first set that is the hungriest for data elements 110. How this is determined will be explained later below.

In step 174, the controller 108 resets the transmit interrupt status flag 118 for that interface 102 (e.g., clears a particular bit of an interrupt status register of that interface 102).

In step 176, the controller 108 moves any data elements that exist in the software queue 120 associated with the selected interface 102 from that software queue 120 to the transmit queue 116 of that interface 102. If there are no data elements 110 within the transmit queue 116 of that interface 102, the controller does not move any data elements 110 for that interface 102.

In step 178, the controller 108 determines whether there are any interfaces 102 in the first set that have not been selected. If there remains at least one unselected interface 102 in the first set, the controller 108 proceeds back to step 172. If there are no interfaces 102 that are unselected in the first set, the controller 108 terminates procedure 170.

Figure 7A:
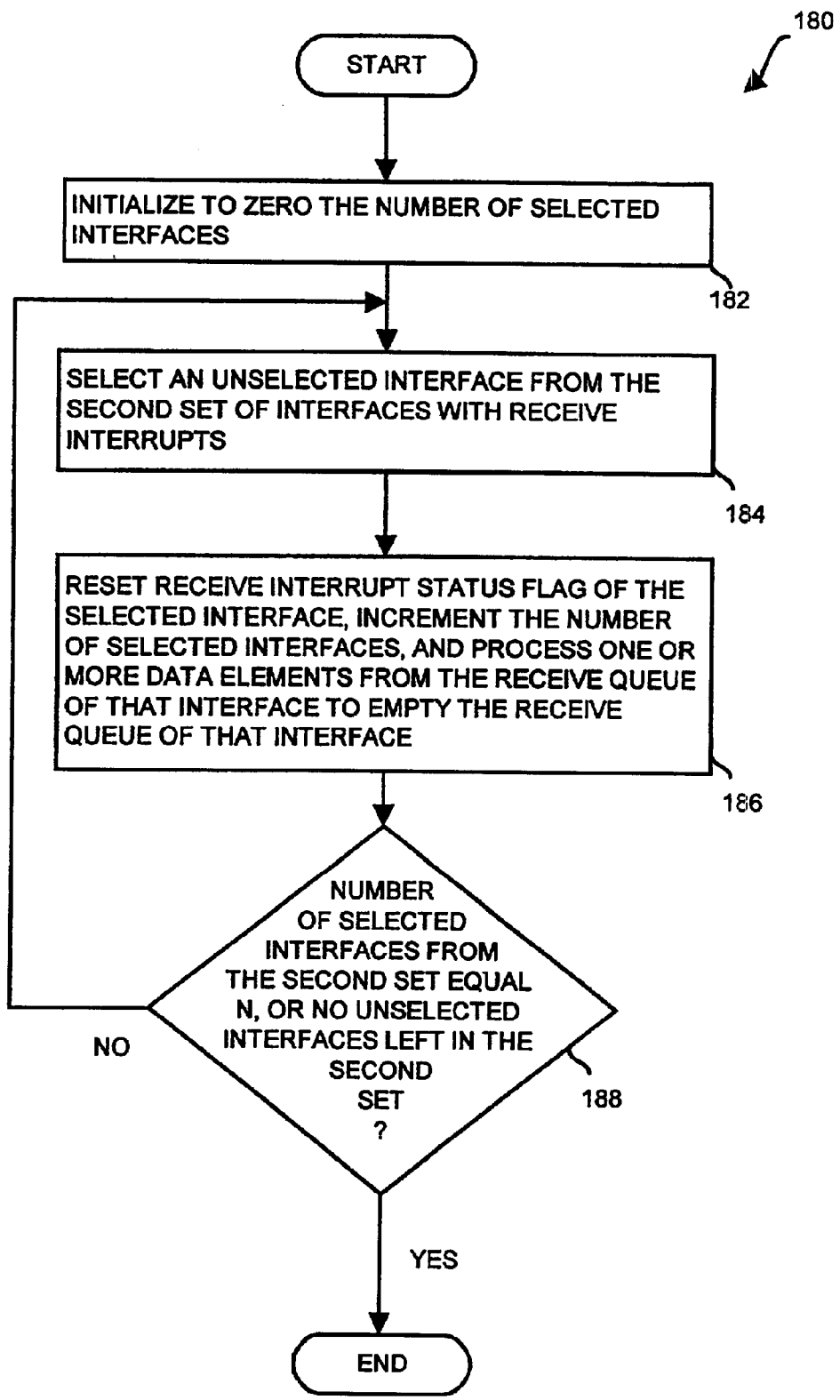
FIG. 7A is a flow diagram of a procedure for running a receive interrupt handler for at most N network interfaces, which is suitable for use as a step of the procedure of FIG. 4.

FIG. 7A illustrates a procedure 180 that is suitable for use as step 148 of the procedure 140 (see FIG. 4), in which the controller 108 runs a receive interrupt handler for any interfaces 102 in the second set (i.e., any interfaces 102 providing a receive interrupt). If there are no interfaces 102 in the second set, the controller 108 simply terminates procedure 180 without performing any of steps 182 through 188 shown in FIG. 7A. However, if there is at least one interface 102 in the second set, the controller 108 proceeds to step 182.

In step 182, the controller 108 initializes a count of the number of selected interfaces 102 to zero. The controller 108 stores this count in the memory 106 as a portion of the network interface information 128.

In step 184, the controller 108 selects an unselected interface 102 from the second set of interfaces 102. Preferably, the controller 108 performs this selection in an organized manner such as based on a pre-established order provided by a system administrator, some other assigned weights 124 (e.g., weights 124 which are different than those used for ordering interfaces 102 in step 146 of FIG. 4), etc.

In step 186, the controller 108 resets the receive interrupt status flag 114 of the receive circuit RX of that interface 102, and increments the number of selected interfaces 102. The controller 108 then processes one or more data elements 110 from the receive queue 112 of the receive circuit RX of the selected interface 102 in order to empty that receive queue 112 of data elements 110 received from the network.

In step 188, the controller 108 determines (i) whether the number of selected interfaces 102 (i.e., the count which was initialized to zero in step 182) from the second set is equal to N (a positive integer), which is an operating constraint 126 stored in the memory 106 (see FIG. 3), or (ii) whether there are no unselected interfaces 102 remaining in the second set. If the number of selected interfaces 102 equals N or if there are no unselected interfaces remaining in the second set, the procedure 180 terminates. Otherwise, step 188 proceeds back to step 184.

It should be understood that each time the controller 108 performs the procedure 180, the controller 108 initializes the count of the number of selected interfaces back to zero in step 182. Accordingly, the controller 108 never processes receive interrupts for more than N interfaces 102 at a time. This constraint on the processing of receive interrupts operates as a limit or restriction to the amount of time the controller 108 spends attending to receive interrupts. This gives the controller 108 the opportunity to return to responding to transmit interrupts thereby giving transmit interrupts higher priority such that data elements 110 are less likely to accumulate within the data communications device 100. Accordingly, the controller 108 of the data communications device 100 is unlikely to become a bottleneck relative to processors of conventional routers.

Figure 7B:
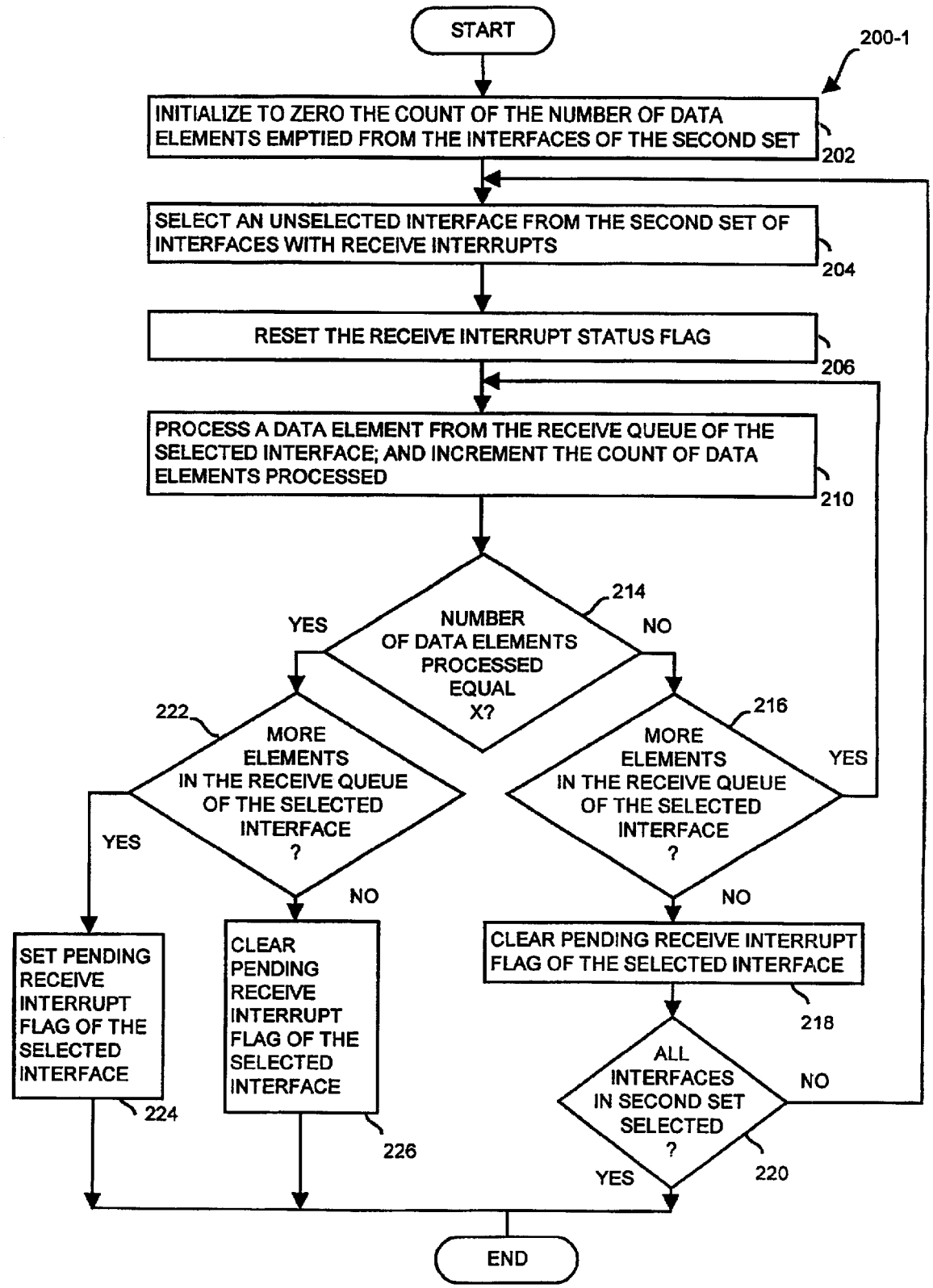
FIG. 7B is a flow diagram of a procedure for running at least one receive interrupt handler to process at most X data elements, which is suitable for use as an alternative to the procedure of FIG. 7A.

FIG. 7B illustrates another procedure 200-1 that is suitable for use as step 148 of the procedure 140, shown in FIG. 4. The procedure 200-1 is a suitable alternative to the procedure 180 of FIG. 7A. Similar to the procedures 180, if there are no interfaces 102 in the second set, the controller 108 terminates procedure 200-1 without performing any of the steps shown in FIG. 7B. However, if there is at least one interface 102 in the second set, the controller 108 proceeds to step 202.

In step 202, the controller 108 initializes to zero a count of the number of data elements 110 emptied from the interfaces 102 of the second set (i.e., processed by the controller 108).

In step 204, the controller 108 selects an unselected interface 102 from the second set of interfaces 102. The controller 108 preferably selects an interface 102 from the second set in an organized manner such as based on a pre-established order provided by a system administrator, some other assigned weights 124, etc.

In step 206, the controller resets the receive interrupt status flag 114 of the selected interface 102.

In step 210, the controller 108 processes a data element 110 from the receive queue 112 of the receive circuit RX of the selected interface 102, and increments the count of data elements processed.

In step 214, the controller 108 determines whether it has emptied X data elements 110 from the interfaces 102 (X being a positive integer). If not, the controller 108 proceeds to 216. If so, the controller 108 proceeds to step 222.

In step 216, i.e., if the controller 108 has not emptied X data elements from the interfaces 102, the controller 108 determines whether there are any more data elements 110 in the receive queue 112 of the selected interface 102. If there is at least one data element 110 remaining in the receive queue 112, the controller 108 returns to step 210 to process another data element 110. Otherwise, the controller 108 proceeds to step 218.

In step 218, the controller 108 clears the pending receive interrupt flag 129 of the selected interface 102.

In step 220, the controller 108 determines whether all of the interfaces 102 within the second set have been selected. If there is at least one unselected interface 102 remaining in the second set, the controller 108 proceeds back to step 204 to select another interface 102 from the second set. If all of the interfaces 102 in the second set have been selected, the controller 108 ends the procedure 200-1.

In step 222, which follows step 214 when the controller 108 determines that it has processed X data elements, the controller 108 determines whether there are any more data elements 110 remaining in the receive queue 112 of the selected interface 102. If there is at least one data element 110 remaining in the receive queue 112 of the selected interface 102, the controller proceeds to step 224. Otherwise, the controller 108 proceeds to step 226.

In step 224, the controller 108 sets the pending receive interrupt flag 129 for the selected interface 102 to indicate that there is at least one data element 110 remaining in the receive queue 112 of the selected interface 102. In contrast, in step 226, the controller 108 clears (or resets) the pending receive interrupt flag 129 for the selected interface 102. Then, following step 224 or step 226, the controller 108 terminates the procedure 200-1.

It should be understood that each time the controller 108 performs the procedure 200-1, the controller 108 initializes the count of the number of data elements 110 processed by the controller 108 back to zero in step 202. As such, the controller 108 never processes more than X data elements 110 at a time (i.e., each time the controller 108 performs the procedure 200-1). This constraint on the processing of data elements 110 operates as a limit or restriction to the amount of time the controller 108 spends attending to receive interrupts. This gives the controller 108 the opportunity to return to responding to transmit interrupts thereby giving transmit interrupts higher priority such that data elements 110 are less likely to accumulate within the data communications device 100. Hence, the controller 108 of the data communications device 100 is unlikely to become a bottleneck relative to processors of conventional routers.

Figure 7C:
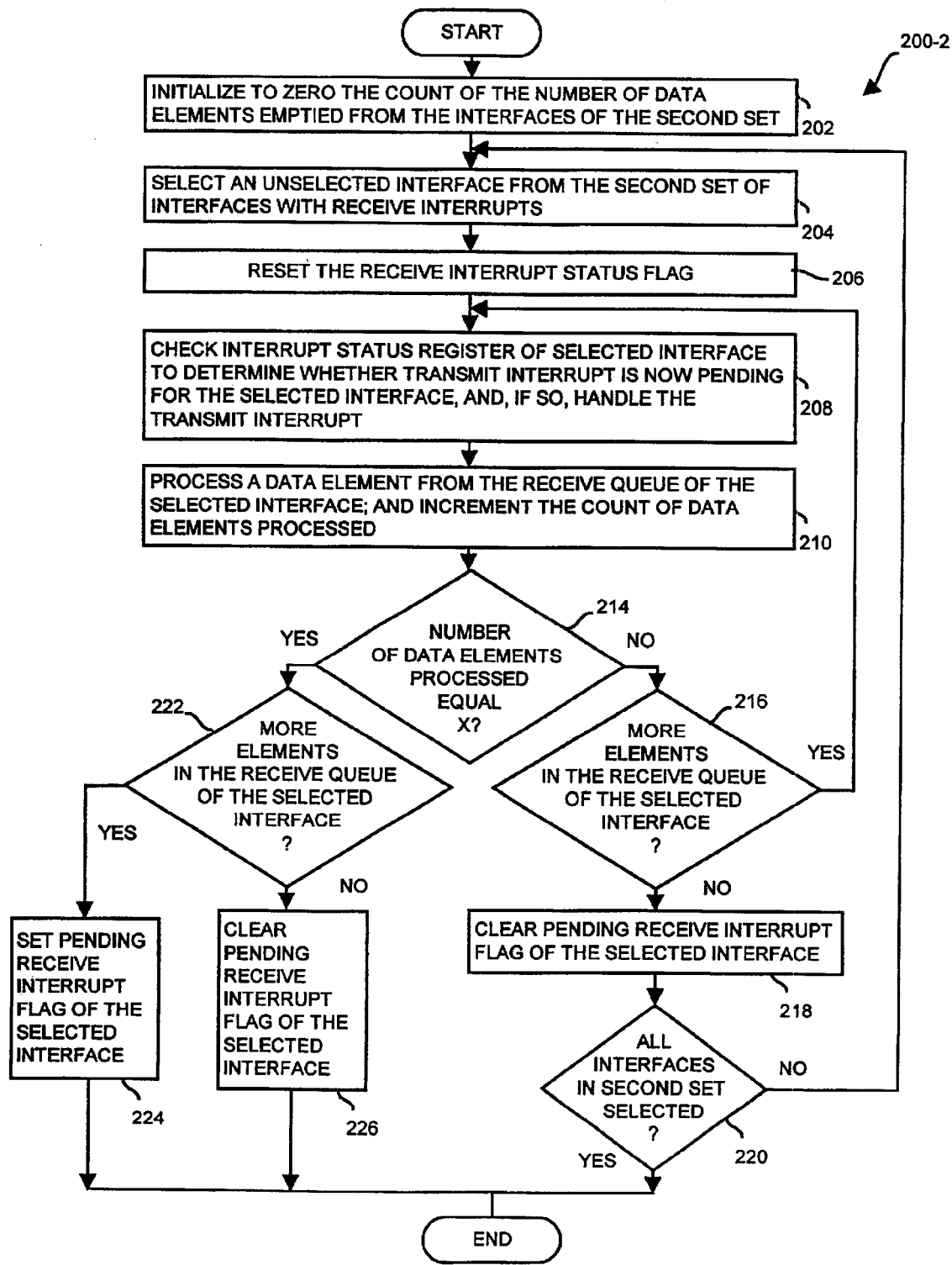
FIG. 7C is a flow diagram of a procedure, which is suitable for use as an alternative to the procedures of FIGS. 7A and 7B, having steps for handling any pending transmit interrupt for an interface before handling a receive interrupt for that interface.

FIG. 7C shows yet another procedure 200-2 that is suitable for use as step 148 of the procedure 140 shown in FIG. 4. The procedure 200-2 is a suitable alternative to the procedure 180 of FIG. 7A or the procedure 200-1 of FIG. 7B. The procedure 200-2 is similar to the procedure 200-1, except that the procedure 200-2 includes an additional step 208 for handling any transmit interrupts which may have recently arisen within the interfaces 102 of the second set. For example, a transmit interrupt may arise within a particular interface 102 just after the controller 108 checks the transmit interrupt status flag 116 of that interface 102.

Step 208 preferably occurs after step 206 in which the controller 108 resets the receive interrupt status flag 118 of the selected interface 102, and before step 210 in which the controller 108 processes a data element 110 from the receive queue 112 of the selected interface 102 (see FIG. 7C). In step 208, the controller 108 checks the interrupt status register of the selected interface 102 to determine whether a transmit interrupt is pending for the selected interface 102. If such a transmit interrupt is pending, the controller 108 handles that transmit interrupt. That is, the controller 108 resets the transmit interrupt flag of the selected interface 102 and, if a data element 110 exists in the software queue 120 associated with the selected interface 102, the controller 108 moves that data element 110 from that software queue 120 to the transmit queue 116 of that interface 102.

The procedure 200-2 provides a restriction on the amount of time the controller 108 spends responding to receive interrupts in a manner similar to that of the procedure 200-1 of FIG. 7B. In particular, the controller 108 is prohibited from processing more than X data elements 110 (X being a positive integer) at a time (i.e., each time the controller performs the procedure 200-1). Moreover, the procedure 200-2 provides multiple additional opportunities for the controller 108 to respond to transmit interrupts in step 208. That is, if there happens to be a transmit interrupt pending within the presently selected interface 102, the controller 108 handles that transmit interrupt before handling the receive interrupt for that interface 102.

Figure 7D:
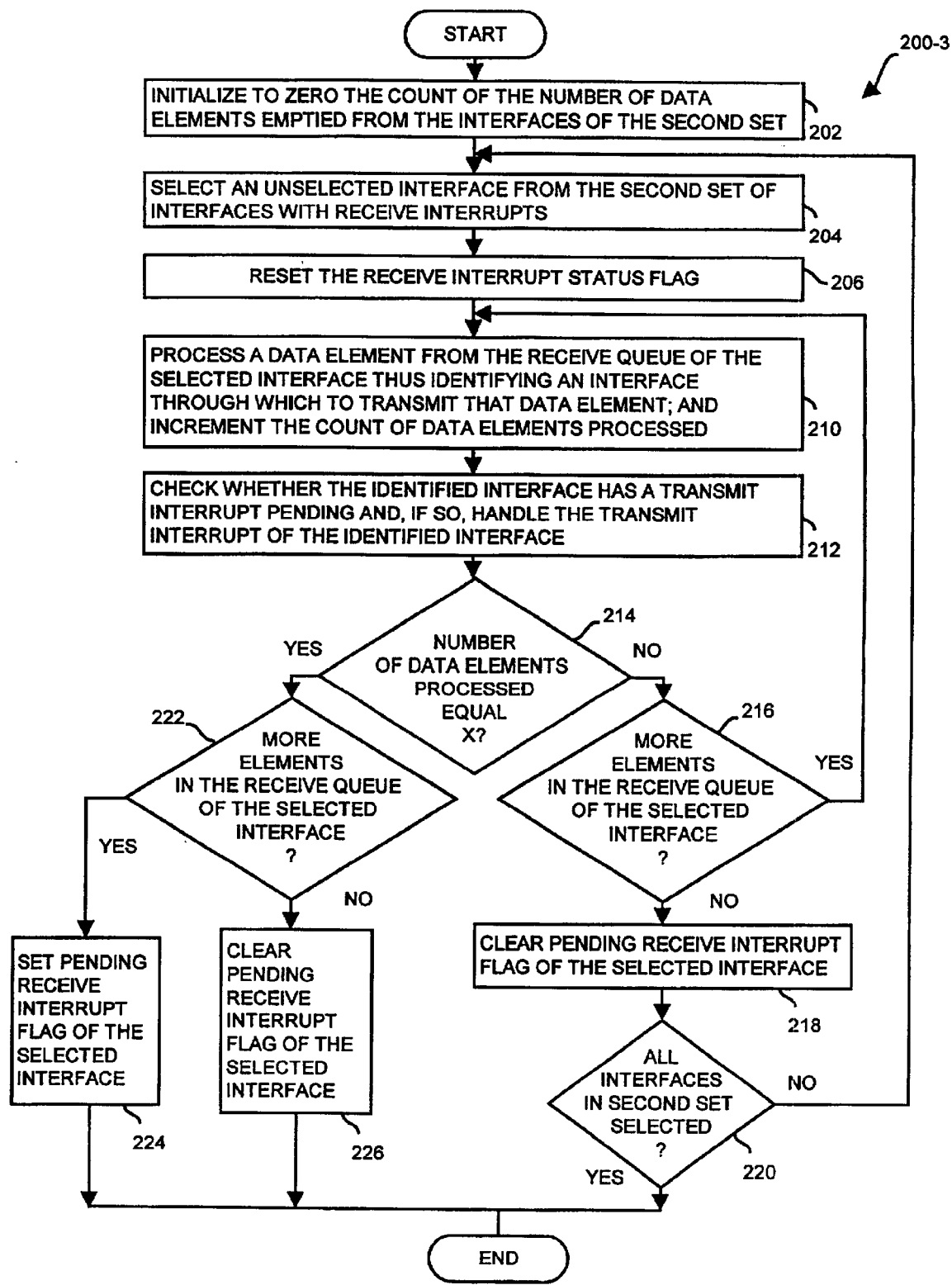

FIG. 7D shows another procedure 200-3 which is suitable for use as step 148 of the procedure 140 shown in FIG. 4. The procedure 200-3 is a suitable alternative to the procedures 180, 200-1 and 200-2 of FIGS. 7A, 7B and 7C. The procedure 200-3 is similar to the procedure 200-1. However, procedure 200-3 includes an additional step 212 after step 210 in which the controller 108 processes a data element 110. In particular, in step 212, the controller 108 checks the interface 102, through which that data element 110 is to be transmitted through, for a transmit interrupt. If the controller 108 finds a transmit interrupt pending in that interface 102, the controller 108 handles that transmit interrupt Further details of step 212 will be provided after reviewing what occurs in step 210.

In step 210, the controller 108 processes a data element 110 from the receive queue 112 of the selected interface 102. In particular, the controller 108 identifies another interface 102 through which to transmit that data element 110. The controller 108 moves that data element 110 to the transmit queue 116 of that interface 102 if the transmit queue 116 has room (i.e., if the transmit queue 116 is not full), or to the software queue 120 associated with that interface 102 if the transmit queue 116 is full.

Then, in step 212, the controller 108 checks whether that identified interface 102 (the interface 102 through which that data element 110 is to be transmitted) has a transmit interrupt pending. If such a transmit interrupt is pending in that interface 102, the controller 108 handles that transmit interrupt. In particular, the controller 108 resets the transmit interrupt flag of the identified interface 102 and, if a data element 110 exists in the software queue 120 associated with that interface 102, the controller 108 moves that data element 110 from that software queue 120 to the transmit queue 116 of that interface 102.

It should be understood that the procedure 200-3 limits the amount of time the controller 108 spends responding to receive interrupts in a manner similar to that of the procedures 200-1 and 200-2 of FIGS. 7B and 7C. In particular, the controller 108 is prohibited from processing more than X data elements 110 (X being a positive integer) at a time (i.e., each time the controller 108 performs the procedure 200-3). Furthermore, the procedure 200-3 provides multiple additional opportunities for the controller 108 to respond to transmit interrupts in step 212. That is, if there is a transmit interrupt pending within the interface 102 through which the most recently processed data element 110 is to be transmitted, the controller 108 handles that transmit interrupt before processing another data element 110 of the selected interface 102.

It should be understood that the procedures 200-2 and 200-3 of FIGS. 7C and 7D allow the controller 108 to handle transmit interrupts during step 148 (also see FIG. 4) when the controller is processing data element newly received by the interfaces 102. That is, such the procedures 200-2, 200-3 enable handling of any new transmit interrupts which occur after the transmit interrupt status flags are checked or reset while in step 148 (e.g., while processing data elements 110 from the receive queues 112). In these arrangements, the controller 108 has the opportunity to handle any new transmit interrupts for certain interfaces 102 in a more timely manner. Accordingly, such the transmit circuits TX of those interfaces 102 are less likely to suffer from starvation.

Figure 8A:
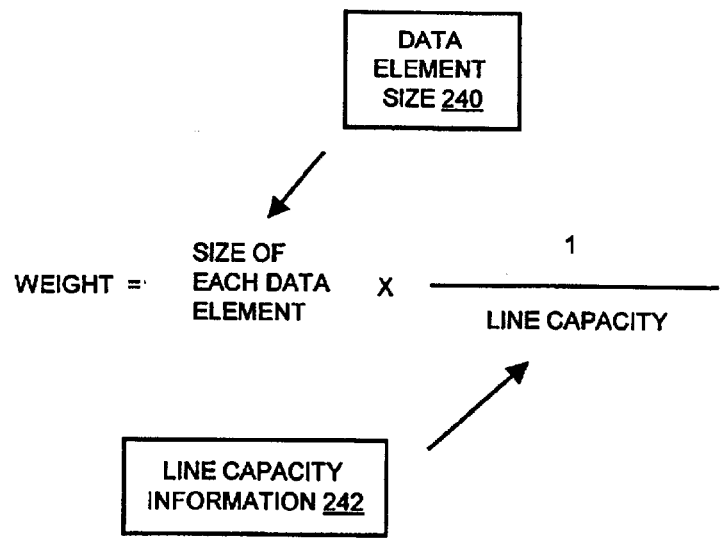
FIG. 8A is a block diagram of an operation for determining a weight for a network interface of the data communications device of FIG. 3.
Figure 8B:
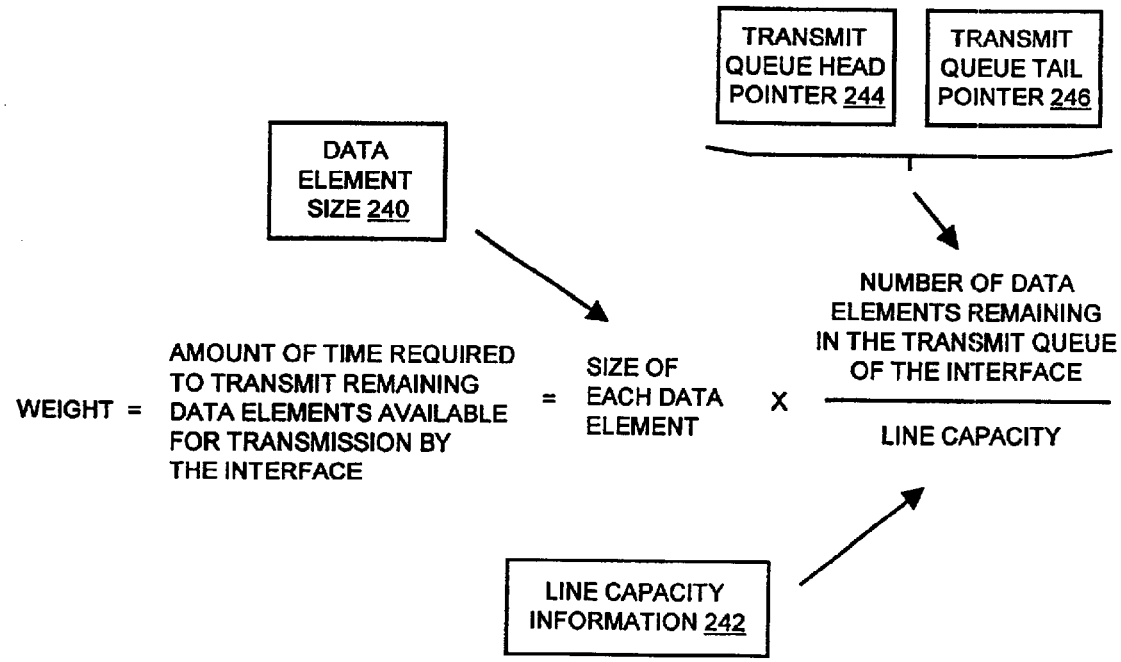
FIG. 8B is a block diagram of an operation for determining a weight for a network interface, which is suitable as an alternative to the operation of FIG. 8A.

Further details of how the controller 108 assigns weights 124 (for use in ordering interfaces in step 146) to the interfaces 102 in step 142 of the procedure 140 of FIG. 4 will now be provided FIGS. 8A, 8B and 8C illustrate a number of operations for generating the weights 124 which are suitable for use in step 142.

In one arrangement, which is shown in FIG. 8A, the controller 108 generates weights based on data element size 240 and the transmission or line capacities 242 of each interface 102. The data element size and line capacity information 240, 242 are a portion of the network interface information 128 stored in the memory 106 (see FIG. 3). This data element size and line capacity information 240, 242 can be obtained by a number of ways, e.g, provided by a system administrator when the data communications device 100 is initially configured, read from a specialized ROM on the interfaces 102, etc.

As shown in FIG. 8A, the controller 108 assigns weights 124 to the interfaces 102 based on data element size 240 and line capacities 242. By way of example only, suppose for the data communication device 100 shown in FIG. 3, the data element size 240 is always the same, the interface 102-1 is an Ethernet interface with a capacity of 10 MB/second, the interface 102-2 is also an Ethernet interface with a capacity of 10 MB/second, and the interface 102-H is a fast Ethernet interface with a capacity of 100 MB/second. In this situation, the controller 108 assigns a more significant weight 124 to the interface 102-H than to interfaces 102-1 and 102-2 due to the larger transmission capacity provided by interface 102-H. In particular, the interface 102-H will have a lower weight (a more significant weight) than interfaces 102-1 and 102-2. The weight assignments in this example indicate that interface 102-H is the "hungriest" for data elements since it has the largest line or transmission capacity. The interfaces 102-1 and 102-2 are "less hungry" due to their relatively lower transmission capacities 242. Accordingly, in step 146 if each of the interfaces 102-1, 102-2 and 102-H have transmit interrupts pending, the controller 108 will respond to the transmit interrupt of interface 102-H before responding to the transmit interrupts of interfaces 102-1 and 102-2, based on the assigned weights. Since the weights of interfaces 102-1 and 102-2 are the same, when the controller 108 is ready to select between these two interfaces 102-1, 102-2, the controller 108 may select one over the other using based on a pre-established order provided by the system administrator or in a round robin fashion.

FIG. 8B shows an operation which is suitable for use in step 142 of FIG. 4. The FIG. 8B operation is a suitable alternative to that shown in FIG. 8A. In particular, the FIG. 8B operation is similar to the operation of FIG. 8A except that the FIG. 8B operation is further based on the number of data elements remaining in the transmit queue 116 of the interface 102. For example, if the transmit queue 112 of a particular interface 102 is empty, the number of data elements 110 in the transmit queue 116 of that interface 102 is zero and the weight 124 assigned to that interface 102 is zero. In contrast, if another interface 102 has a data element 110 in its transmit queue 116, its assigned weight 124 is non-zero. In this example, the controller 108 views the interface 102 with the lower weight to be hungrier than the interface 102 with the higher weight. Accordingly, the controller 108 views the interface with the empty transmit queue 116 to be hungrier than the other interface 102 with the transmit queue 116 having a data element 110 within it. As a result, in step 146 (also see FIG. 4), the controller 108 will respond to a transmit interrupt from the interfaces 102 with the empty queue 116 before responding to the transmit interrupt of the other interface 102 with the transmit queue 116 having a data element 110 therein.

It should be understood that the number of data elements 110 residing in the transmit queue 116 of each interface 102 can be easily determined using conventional queue parameter operations. For example, the number of data elements 110 in a particular transmit queue 116 can be determined from the head and tail pointers (e.g., pointer 244, 246, see FIG. 8B) which track the beginning and end of a dynamic transmit queue 116. The resulting weight 124 for each interface 102 is the amount of time required to transmit all data elements 110 residing in the transmit queue 116 of that interface 102.

FIG. 8C shows another operation for generating the weights 124 which is suitable for use in step 142. In this arrangement, the controller 108 generates the weights 124 based on the number of processed data elements stored in the interconnection mechanism 104 which are ready for transmission through the transmit circuits TX of the various interfaces 102. For example, suppose that there are four data elements 110 within the software queue 120 for the interface 102-1 which are ready for transmission through the interface 102-1, and two data elements 110 within the software queue 120 for the interface 102-2 which are ready for transmission through the interface 102-2. The interface 102-1 is given a lower, more significant weight than interface 102-2. Accordingly, the controller 108 will respond to a transmit interrupt for the interface 102-1 before responding to a transmit interrupt for the interface 102-2 in step 146 of FIG. 4.

It should be understood that the weights 124 generated by the operations of FIGS. 8B and 8C are dynamic. That is, the values of the weights 124 will change during the operation of the data communications device 100 based on the changing values of the parameters used within the weight operations. In connection with the operation of FIG. 8B, the weights 124 will change over time based on the number of data elements 110 within the respective transmit queues 116 of the interfaces 102. In connection with the operation of FIG. 8C, the weights will change over time based on the number of data elements 110 residing in the interconnection mechanism 104 for each interface 102.

Step 142 may be optimized as follows. For dynamic weights 124, step 142 may be performed at different time intervals based on system dynamics (e.g., internal system conditions, time, external traffic conditions, etc.). Furthermore, the queue lengths used when computing the weights 124 can be estimated using mathematical techniques such as exponential averaging. In addition, the weight 124 in FIG. 8B may be computed using specialized hardware (e.g., by one or more ASICs).

In contrast, the weights 124 for the operation of FIG. 8A are static. That is, the weights 124 will not change during normal operation of the data communications device 100. In this arrangement, step 148 of FIG. 4 does not need to loop back to step 142 to re-assign the weights 124 for each loop of procedure 140. Rather, step 148 can loop back to step 144 thus avoiding having to repeat step 142 when the weights 124 are static.

The techniques described above enable a data communications device to respond to transmit and receive interrupts in a manner that places higher priority on transmit interrupts over receive interrupts in order to minimize the idle time of outbound links. As processing demands increase over time, the data communications device is better suited to avoid the drawbacks of conventional routers. In one arrangement, the data communications device can exclusively run all the transmit interrupt handlers to handle transmit interrupts for interfaces of the data communications devices. Then, the data communications device can attend to any receive interrupts. In some arrangements, the data communications device (i) checks for new transmit interrupts while attending to the receive interrupts, and (ii) responds to those transmit interrupts while attending the receive interrupts such that the receive interrupts are not handled in an exclusive manner. Accordingly, the likelihood of the controller of the data communications device operating in a manner that "starves" the transmit circuits of the interfaces is low. The features of the invention may be particularly useful in computerized devices manufactured by Cisco Systems, Inc. of San Jose, Calif.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the transmit and receive interrupt handlers 123 can be separate from the operating system 122. In such an arrangement, the transmit and receive interrupt handlers 123 can be transported without the operating system 122 (e.g., the interrupt handlers 123 can be installed within the data communications device 100 from a computer program product 130 at some time after the data communications device 100 has been in operation operating in accordance with the operating system 122).

Additionally, it should be understood that portions of step 144, which involves the controller 108 determining which interfaces 102 indicate pending transmit interrupts and which interfaces indicate pending receive interrupts, can occur at different times than that shown in FIG. 4. For example, the controller 108 can determine which interfaces 102 have pending transmit interrupts (by reading transmit interrupt status flags 116) prior to step 146 (in which the controller 108 handles the transmit interrupts), and the controller 108 can determine which interfaces 102 have pending receive interrupts (by reading receive interrupt status flags 112 and pending receive interrupt flags 129) during or after step 146 and before step 148 (in which the controller 108 handles the receive interrupts).

The invention can also apply to interconnection devices without interrupts. For example, in contrast to the interfaces 102 raising interrupts to the controller 108, the controller 108 can poll the transmit and receive status flags 118, 114 and respond to the interfaces 102 based on values of those flags 118, 114. In one arrangement, the techniques of the invention are implemented using thread-based. fast packet (or data element) processing.

Additionally, it should be understood that various configurations other than that shown in FIG. 3 are suitable for use as the data communications device 100. For example, the data elements 110 are not limited to network packets. Rather, the data elements 110 can be frames, cells or other messaging or signaling constructs. As another example, the memory 106 may be distributed such that some portions of the memory are external to the data communications device. In other arrangements, some of the portions of the memory 106 may reside in the controller 108 or the interfaces 102. Additionally, the controller 108 may include multiple processing units and operate in a multiprocessing manner such that various portions of the steps described in the procedures above run concurrently.

Furthermore, it should be understood that the data communications device 100 may include other components. For example, the device may include a forwarding information base (FIB), and the controller 108 may perform a FIB lookup operation to determine outgoing interfaces 102 for the data elements 110. As another example, the device 100 may include decapsulation and encapsulation modules, and/or decryption and encryption modules for further processing data elements 110.

Additionally, it should be understood that other operations for generating and assigning the weights 124 are suitable for use by the invention. For example, the weights 124 can be based on external traffic patterns residing within the network, or can be provided directly by a system administrator. Also, the weights 124 themselves or the operations for determining the weights 124 can change over time, e.g., according to events, a preset schedule, or the time of day, etc.

Furthermore, it should be understood that the operations for generating and assigning the weights 124, as well as other operating parameters such as N or X of the operating constraints 126 and the network interface information 128 can be tuned or adjusted over time (e.g., by a system administrator) to optimize the operation and throughput of the data communications device 100. These features of the invention may be particularly useful in data communications devices manufactured by Cisco Systems, Inc. of San Jose, Calif.

What is claimed is:

1. In a data communications device having multiple network interfaces which are capable of transmitting and receiving data elements with a network, a method comprising the steps of:

A. determining which of the multiple network interfaces indicates readiness to transmit a data element to the network and which of the multiple network interfaces indicates receipt of a data element from the network;

B. exclusively running, for each network interface indicating readiness to transmit a data element to the network, a transmit interrupt handler to load that network interface with a data element for transmission if such a data element is available for transmission within the data communications device; and C. after step B, running, for at least one network interface which indicates receipt of a data element from the network, a receive interrupt handler to process that data element.

2. The method of claim 1 wherein more than N network interfaces indicate receipt of a data element from the network, wherein N is a positive integer, and wherein step C includes the steps of:

running, for N network interfaces indicating receipt of a data element from the network, a receive interrupt handler to process that data element; and refraining from running receive interrupt handlers for more than the N network interfaces until step A and step B are repeated.

3. The method of claim 1 wherein the network interfaces receive more than X data elements, wherein X is a positive integer, and wherein step C includes the steps of:

running, for at least one network interface indicating receipt of a data element from the network, a receive interrupt handler to process that data element until X data elements have been processed; and refraining from processing more than the X data elements until step A and step B are repeated.

4. The method of claim 1 wherein step C includes the steps of:

running, for a particular network interface which indicates receipt of a first data element from the network, a transmit interrupt handler to load the particular network interface with a second data element for transmission if such a second data element is available for transmission within the data communications device; and subsequently running a receive interrupt handler to process the first data element.

5. The method of claim 1 wherein step C includes the steps of:

running, for a particular network interface which indicates receipt of a data element from the network, a receive interrupt handler to process that data element; and running a transmit interrupt handler for another interface through which that data element is to be transmitted if a transmit interrupt is pending for that other interface.

6. The method of claim 1, further comprising the step of:

assigning weights to the network interfaces based on transmission capacities of the network interfaces such that, in step B, transmit interrupt handlers for the network interfaces run in an order determined by the assigned weights.

7. The method of claim 1, further comprising the step of:

assigning weights to the network interfaces based on numbers of data elements ready for transmission through each network interface such that, in step B, transmit interrupt handlers for the network interfaces run in an order determined by the assigned weights.

8. The method of claim 1, further comprising the step of:

assigning weights to the network interfaces based on transmission capacities of the network interfaces and numbers of data elements ready for transmission through each network interface such that, in step B, transmit interrupt handlers for the network interfaces run in an order determined by the assigned weights.

9. The method of claim 1, further comprising the step of:

assigning weights to the network interfaces based on respective numbers of processed data elements which are ready for transmission through the network interfaces such that, in step B, transmit interrupt handlers for the network interfaces run in an order determined by the assigned weights.

10. A data communications device, comprising:

multiple network interfaces which are capable of transmitting and receiving data elements with a network; and a controller, coupled to the multiple network interfaces, which is configured to perform a method comprising the steps of:

A. determining which of the multiple network interfaces indicates readiness to transmit a data element to the network and which of the multiple network interfaces indicates receipt of a data element from the network;

B. exclusively running, for each network interface indicating readiness to transmit a data element to the network, a transmit interrupt handler to load that network interface with a data element for transmission if such a data element is available for transmission within the data communications device; and C. after step B, running, for at least one network interface which indicates receipt of a data element from the network, a receive interrupt handler to process that data element.

11. The data communications device of claim 10 wherein more than N network interfaces indicate receipt of a data element from the network, wherein N is a positive integer, and wherein the controller is configured such that step C includes the steps of:

running, for N network interfaces indicating receipt of a data element from the network, a receive interrupt handler to process that data element; and refraining from running receive interrupt handlers for more than the N network interfaces until step A and step B are repeated.

12. The data communications device of claim 10 wherein the network interfaces receive more than X data elements, wherein X is a positive integer, and wherein the controller is configured such that step C includes the steps of:

running, for at least one network interface indicating receipt of a data element from the network, a receive interrupt handler to process that data element until X data elements have been processed; and refraining from processing more than the X data elements until step A and step B are repeated.

13. The data communications device of claim 10 wherein the controller is configured such that step C includes the steps of:

running, for a particular network interface which indicates receipt of a first data element from the network, a transmit interrupt handler to load the particular network interface with a second data element for transmission if such a second data element is available for transmission within the data communications device; and subsequently running a receive interrupt handler to process the first data element.

14. The data communications device of claim 10 wherein the controller is configured such that step C includes the steps of:

running, for a particular network interface which indicates receipt of a data element from the network, a receive interrupt handler to process that data element; and running a transmit interrupt handler for another interface through which that data element is to be transmitted if a transmit interrupt is pending for that other interface.

15. The data communications device of claim 10 wherein the controller is configured such that the method further includes the step of:
    assigning weights to the network interfaces based on transmission capacities of the network interfaces such that, in step B, transmit interrupt handlers for the network interfaces run in an order determined by the assigned weights.

16. The data communications device of claim 10 wherein the controller is configured such that the method further includes the step of:
    assigning weights to the network interfaces based on numbers of data elements ready for transmission through each network interface such that, in step B, transmit interrupt handlers for the network interfaces run in an order determined by the assigned weights.

17. The data communications device of claim 10 wherein the controller is configured such that the method further includes the step of:
    assigning weights to the network interfaces based on transmission capacities of the network interfaces and numbers of data elements ready for transmission through each network interface such that, in step B, transmit interrupt handlers for the network interfaces run in an order determined by the assigned weights.

18. The data communications device of claim 10 wherein the controller is configured such that the method further includes the step of:
    assigning weights to the network interfaces based on respective numbers of processed data elements which are ready for transmission through the network interfaces such that, in step B, transmit interrupt handlers for the network interfaces run in an order determined by the assigned weights.

19. A computer program product that includes a computer readable medium having instructions stored thereon, such that the instructions, when processed by a data communications device having multiple network interfaces which are capable of transmitting and receiving data elements with a network, cause the data communications device to perform the steps of:
    A. determining which of the multiple network interfaces indicates readiness to transmit a data element to the network and which of the multiple network interface indicates receipt of a data element from the network;
    B. exclusively running, for each network interface indicating readiness to transmit a data element to the network, a transmit interrupt handler to load that network interface with a data element for transmission if such a data element is available for transmission within the data communications device; and
    C. after step B, running, for at least one network interface which indicates receipt of a data element from the network, a receive interrupt handler to process that data element.

20. The computer program product of claim 19 wherein, when more than N network interfaces indicate receipt of a data element from the network, N being a positive integer, step C includes the steps of:
    running, for N network interfaces indicating receipt of a data element from the network, a receive interrupt handler to process that data element; and
    refraining from running receive interrupt handlers for more than the N network interfaces until step A and step B are repeated.

21. The computer program product of claim 19 wherein, when the network interfaces receive more than X data elements, X being a positive integer, step C includes the steps of:
    running, for at least one network interface indicating receipt of a data element from the network, a receive interrupt handler to process that data element until X data elements have been processed; and
    refraining from processing more than the X data elements until step A and step B are repeated.

22. The computer program product of claim 19 wherein step C includes the steps of:
    running, for a particular network interface which indicates receipt of a first data element from the network, a transmit interrupt handler to load the particular network interface with a second data element for transmission if such a second data element is available for transmission within the data communications device; and
    subsequently running a receive interrupt handler to process the first data element.

23. The computer program product of claim 19 wherein step C includes the steps of:
    running, for a particular network interface which indicates receipt of a data element from the network, a receive interrupt handler to process that data element; and
    running a transmit interrupt handler for another interface through which that data element is to be transmitted if a transmit interrupt is pending for that other interface.

24. The computer program product of claim 19 wherein the instructions further cause the data communications device to perform the step of:
    assigning weights to the network interfaces based on transmission capacities of the network interfaces such that, in step B, transmit interrupt handlers for the network interfaces run in an order determined by the assigned weights.

25. The computer program product of claim 19 wherein the instructions further cause the data communications device to perform the step of:
    assigning weights to the network interfaces based on numbers of data elements ready for transmission through each network interface such that, in step B, transmit interrupt handlers for the network interfaces run in an order determined by the assigned weights.

26. The computer program product of claim 19 wherein the instructions further cause the data communications device to perform the step of:
    assigning weights to the network interfaces based on transmission capacities of the network interfaces and numbers of data elements ready for transmission through each network interface such that, in step B, transmit interrupt handlers for the network interfaces run in an order determined by the assigned weights.

27. The computer program product of claim 19 wherein the instructions further cause the data communications device to perform the step of:
    assigning weights to the network interfaces based on respective numbers of processed data elements which are ready for transmission through the network interfaces such that, in step B, transmit interrupt handlers for the network interfaces run in an order determined by the assigned weights.

28. In a data communications device having a first network interface, a second network interface, and an interconnection mechanism coupled to the first and second network interfaces, the first network interface storing a data element to be processed by data communications device, a method for transferring data elements comprising the steps of:

A. moving a first processed data element from the interconnection mechanism to the first network interface for transmission of the first processed data element into a network through the first network interface;

B. after step A, moving a second processed data element from the interconnection mechanism to the second network interface for transmission of the second processed data element into the network through the second network interface; and C. after step B, moving the data element stored by the first network interface from the first network interface to the interconnection mechanism.

29. A data communications device, comprising:

a first network interface which stores a data element to be processed by data communications device;

a second network interface; and an interconnection mechanism, coupled to the first and second network interface, that includes (i) memory which stores a first processed data element and a second processed data element, and (ii) a controller, wherein the controller is configured to perform a method comprising the steps of:

A. moving a first processed data element from the interconnection mechanism to the first network interface for transmission of the first processed data element into a network through the first network interface;

B. after step A, moving a second processed data element from the interconnection mechanism to the second network interface for transmission of the second processed data element into the network through the second network interface; and C. after step B, moving the data element stored by the first network interface from the first network interface to the interconnection mechanism.

30. A computer program product that includes a computer readable medium having instructions stored thereon, such that the instructions, when processed by a data communications device having a first network interface, a second network interface, and an interconnection mechanism coupled to the first and second network interfaces, cause the data communications device to perform the steps of:

A. moving a first processed data element from the interconnection mechanism to the first network interface for transmission of the first processed data element into a network through the first network interface;

B. after step A, moving a second processed data element from the interconnection mechanism to the second network interface for transmission of the second processed data element into the network through the second network interface; and C. after step B, moving the data element stored by the first network interface from the first network interface to the interconnection mechanism.

* * * * *

UNITED STATES PATENT AND TRADEMARK OFFICE
CERTIFICATE OF CORRECTION

PATENT NO. : 6,832,265 B1
DATED : December 14, 2001
INVENTOR(S) : Qingming Ma, Saravanan Agasaveeran and Satish Gannu It is certified that error appears in the above-identified patent and that said Letters Patent is hereby corrected as shown below:

Column 21,
Line 46, "network interface" should read -- network interfaces --.

Signed and Sealed this

Thirty-first Day of May, 2005

JON W. DUDAS
*Director of the United States Patent and Trademark Office*